United States Patent
Li et al.

(10) Patent No.: US 12,284,034 B2
(45) Date of Patent: Apr. 22, 2025

(54) CODE BLOCK IDENTIFICATION METHOD AND APPARATUS

(71) Applicant: HUAWEI TECHNOLOGIES CO., LTD., Guangdong (CN)

(72) Inventors: Rixin Li, Dongguan (CN); Qiwen Zhong, Shenzhen (CN); Li Xu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/324,372

(22) Filed: May 26, 2023

(65) Prior Publication Data
US 2023/0299880 A1 Sep. 21, 2023

Related U.S. Application Data

(63) Continuation of application No. PCT/CN2021/130372, filed on Nov. 12, 2021.

(30) Foreign Application Priority Data

Nov. 30, 2020 (CN) .......................... 202011381360.2

(51) Int. Cl.
*H04L 1/00* (2006.01)

(52) U.S. Cl.
CPC .......... *H04L 1/0057* (2013.01); *H04L 1/0045* (2013.01)

(58) Field of Classification Search
CPC ..... H04L 1/0057; H04L 1/0045; H04L 69/22; H04L 69/324
See application file for complete search history.

(56) References Cited

U.S. PATENT DOCUMENTS

| | | |
|---|---|---|
| 6,331,976 B1 | 12/2001 | Sriram |
| 2010/0150037 A1 | 6/2010 | Becker et al. |
| 2013/0114645 A1 | 5/2013 | Huang et al. |

(Continued)

FOREIGN PATENT DOCUMENTS

| | | |
|---|---|---|
| CN | 102195750 A | 9/2011 |
| CN | 109995455 A | 7/2019 |
| WO | 2019071598 A1 | 4/2019 |

OTHER PUBLICATIONS

Editors G. mtn et al., "Draft new Recommendation G.8312 (ex-G. mtn) (for consent)," TD568R1-PLEN, Study Group 15, Sep. 7-18, 2020; 21 total pages.

(Continued)

*Primary Examiner* — Thien Nguyen
(74) *Attorney, Agent, or Firm* — Rimon PC

(57) ABSTRACT

This application discloses a code block identification method and related apparatus. The method includes: obtaining a code block stream, where the code block stream includes a first code block; determining a to-be-identified bit pattern and comparing the to-be-identified bit pattern with a template bit pattern to obtain a quantity of inconsistent bits; and identifying the first code block as a first boundary code block when the quantity of inconsistent bits is less than or equal to a first threshold. The to-be-identified bit pattern includes a first bit pattern and corresponds to the first code block. The template bit pattern includes a first template bit pattern and corresponds to the first boundary code block.

20 Claims, 24 Drawing Sheets

(56) References Cited

U.S. PATENT DOCUMENTS

| | | | |
|---|---|---|---|
| 2018/0123714 A1 | 5/2018 | Zhong et al. | |
| 2019/0050285 A1* | 2/2019 | Lin | G06F 11/1048 |
| 2019/0140861 A1* | 5/2019 | Zhong | H04J 3/1658 |
| 2019/0319742 A1* | 10/2019 | Wu | H04L 1/0057 |
| 2020/0396739 A1* | 12/2020 | Sundararajan | H04L 1/1614 |
| 2023/0198670 A1* | 6/2023 | Strobel | H04L 1/0057 |
| | | | 370/310 |

OTHER PUBLICATIONS

IA Flex Ethernet 2.1 Implementation Agreement, "Flex Ethernet Implementation Agreement 2.1," IA # OIF FLEXE-02.1. Jul. 2019; 56 total pages.

\* cited by examiner

| 8 octets with T/RXC | 0000000001111111111222222222233333333334444444444555555555566666 | | | | | | | | 2.5/5 10GE | 40GE 100GE | CPRI |
|---|---|---|---|---|---|---|---|---|---|---|---|
| | 01234567 | D0 | D1 | D2 | D3 | D4 | D5 | D6 | D7 | | | |
| D0 D1 D2 D3 D4 D5 D6 D7 | 0 | 0x1E | | | | | | | | Valid | Valid | Valid |
| C0 C1 C2 C3 C4 C5 C6 C7 | 1 | 0x2D | C0 | C1 | C2 | C3 | C4 | C5 | C6 | C7 | Valid | Valid | Invalid |
| C0 C1 C2 C3 O4 D5 D6 D7 | 1 | 0x33 | C0 | C1 | C2 | C3 | O4 | D5 | D6 | C7 | Valid | Invalid | Invalid |
| C0 C1 C2 C3 S4 D5 D6 D7 | 1 | 0x66 | | | | | | | | | Valid | Invalid | Invalid |
| O0 D1 D2 D3 O4 D5 D6 D7 | 1 | 0x55 | D1 | D2 | D3 | O0 | O4 | D5 | D6 | D7 | Valid | Invalid | Invalid |
| S0 D1 D2 D3 D4 D5 D6 D7 | 1 | 0x78 | D1 | D2 | D3 | D4 | | | | | Valid | Valid | Valid |
| O0 C1 C2 C3 C4 C5 C6 C7 | 1 | 0x4B | | C1 | C2 | C3 | C4 | C5 | C6 | C7 | Valid | Valid | Invalid |
| O0 D1 C2 C3 C4 C5 C6 C7 | 1 | 0x87 | D1 | | C2 | C3 | C4 | C5 | C6 | C7 | Valid | Valid | Invalid |
| T0 D1 C2 C3 C4 C5 C6 C7 | 1 | 0x99 | D1 | | C2 | C3 | C4 | C5 | C6 | C7 | Valid | Valid | Invalid |
| D0 D1 C2 C3 C4 C5 C6 C7 | 1 | 0xAA | D1 | | C2 | C3 | C4 | C5 | C6 | C7 | Valid | Valid | Invalid |
| D0 D1 D2 T3 C4 C5 C6 C7 | 1 | 0xB4 | D1 | D2 | | | C4 | C5 | C6 | C7 | Valid | Valid | Invalid |
| D0 D1 D2 D3 T4 C5 C6 C7 | 1 | 0xCC | D1 | D2 | D3 | | | C5 | C6 | C7 | Valid | Valid | Invalid |
| D0 D1 D2 D3 D4 T5 C6 C7 | 1 | 0xD2 | D1 | D2 | D3 | D4 | | | C6 | C7 | Valid | Valid | Invalid |
| D0 D1 D2 D3 D4 D5 T6 C7 | 1 | 0xE1 | D1 | D2 | D3 | D4 | D5 | | | C7 | Valid | Valid | Invalid |
| D0 D1 D2 D3 D4 D5 D6 T7 | 1 | 0xFF | D1 | D2 | D3 | D4 | D5 | D6 | | | Valid | Valid | Valid |
| | 1 0 | Reserved | R R R R R R R R R R R R R R R R R R R R R R R R R R R R R R R R R R R R R R R R R R R R R R R R R R R R R R R R R R R R R R R | | | | | | | | | | |

CODE BLOCK IDENTIFICATION METHOD AND APPARATUS

CROSS-REFERENCE TO RELATED APPLICATIONS

This application is a continuation of International Application No. PCT/CN2021/130372, filed on Nov. 12, 2021, which claims priority to Chinese Patent Application No. 202011381360.2, filed on Nov. 30, 2020. The disclosures of the aforementioned applications are hereby incorporated by reference in their entireties.

TECHNICAL FIELD

This application relates to the field of communication technologies, and in particular, to a code block identification method and related apparatus.

BACKGROUND

Generally, after obtaining a client signal, a transmit end sends the client signal in a form of code block. For example, the client signal may be sent in a form of a start code block, a data code block, or an end code block (which together may be referred to as a code block stream).

After receiving the code block stream, to obtain the client signal from the code block stream, the receive end needs to identify the start code block in the code block stream.

Therefore, how to identify a start (S) code block needs to be urgently resolved.

SUMMARY

This application provides a code block identification method and related apparatus, to effectively solve the problem that a start code block cannot be identified due to an occasional bit error, thereby improving system fault tolerance.

According to a first aspect, an embodiment of this application provides a code block identification method. The method includes: obtaining a code block stream, where the code block stream includes a first code block; determining a to-be-identified bit pattern, where the to-be-identified bit pattern includes a first bit pattern, and the first bit pattern is a bit pattern corresponding to the first code block; comparing the to-be-identified bit pattern with a template bit pattern to obtain a quantity of inconsistent bits, where the template bit pattern includes a first template bit pattern, and the first template bit pattern is a template bit pattern corresponding to a first boundary code block; and identifying the first code block as the first boundary code block when the quantity of inconsistent bits is less than or equal to a first threshold.

In some embodiments of this application, the first bit pattern corresponds to the first template bit pattern, that is, a position of the first bit pattern in the to-be-identified bit pattern corresponds to a position of the first template bit pattern in the template bit pattern. Alternatively, it may be understood that the first template bit pattern is used to identify the first bit pattern. In addition, a bit position in the first bit pattern corresponds to a bit position in the first template bit pattern. For example, a $0^{th}$ bit in the first bit pattern corresponds to a $0^{th}$ bit in the first template bit pattern, a Pt bit in the first bit pattern corresponds to a $1^{st}$ bit in the first template bit pattern, a $2^{nd}$ bit in the first bit pattern corresponds to a $2^{nd}$ bit in the first template bit pattern, and by analogy. It may be understood that descriptions of the first bit pattern and the first template bit pattern are also applicable to a second bit pattern and a second template bit pattern, and a third bit pattern and a third template bit pattern that are shown in this application. Details are not described in the following.

According to the method provided in some embodiments of this application, when a quantity of inconsistent bits between the first code block and the first boundary code block (for example, an S code block) is not 0, the case in which it is determined that the first code block is not the first boundary code block can be effectively avoided. Therefore, the issue in which the first code block cannot be identified as the first boundary code block due to an occasional bit error is resolved, thereby improving system fault tolerance.

In a possible implementation, the first code block is a P1B/P2B code block, P1 is a quantity of payload bits of the first code block, and P2 is a total quantity of bits of the first code block. P2−P1 represents a quantity of bits of a synchronization header of the first code block, P1 and P2 are respectively positive integers, and P2 is greater than P1.

In a possible implementation, the first bit pattern includes a pattern including a $0^{th}$ bit to a $9^{th}$ bit of the first code block, and a start bit of the first code block is the $0^{th}$ bit.

In some embodiments of this application, whether the first code block is the first boundary code block is identified by obtaining the $0^{th}$ bit to the $9^{th}$ bit of the first code block. This is not only convenience and simply in implementation, but also can ensure reliability of identifying the first code block as the first boundary code block.

Certainly, in some embodiments of this application, the first bit pattern may further include a pattern including the $0^{th}$ bit to a $65^{th}$ bit of the first code block, and the like. A specific structure of the first bit pattern is not limited in some embodiments of this application.

In a possible implementation, the $0^{th}$ bit of the first code block and the $1^{st}$ bit of the first code block are a synchronization header of the first code block, and the $2^{nd}$ bit of the first code block to the $9^{th}$ bit of the first code block are a control block type field of the first code block.

It may be understood that the $2^{nd}$ bit to the $9^{th}$ bit of the first code block may alternatively be a data byte of the first code block. For example, when the first code block is not the first boundary code block but a data code block, the bits between the $2^{nd}$ bit to the $9^{th}$ bit are a first data byte of the data code block.

In a possible implementation, the identifying the first code block as the first boundary code block when the quantity of inconsistent bits is less than or equal to a first threshold includes:

when there exist inconsistent bits between the to-be-identified bit pattern and the template bit pattern, and the quantity of inconsistent bits is less than or equal to the first threshold, identifying the first code block as the first boundary code block.

In other words, in some embodiments of this application, when the quantity of inconsistent bits between the to-be-identified bit pattern and the template bit pattern is greater than or equal to 1, and the quantity of inconsistent bits is less than or equal to the first threshold, a communication apparatus can still identify the first code block as the first boundary code block.

In a possible implementation, the identifying the first code block as the first boundary code block when the quantity of inconsistent bits is less than or equal to a first threshold includes: when the first bit pattern is inconsistent with the first template bit pattern, and the quantity of inconsistent bits is less than or equal to the first threshold, identifying the first code block as the first boundary code block.

Generally, when the synchronization header of the first code block is 0b10, and the control block type field is 0x78, the first code block is the first boundary code block. However, in some embodiments of this application, even if the synchronization header of the first code block is not 0b10, and/or the control block type field of the first code block is not 0x78, but the quantity of inconsistent bits is less than or equal to the first threshold, the first code block may still be identified as the first boundary code block.

In a possible implementation, the code block stream further includes a second code block, the to-be-identified bit pattern further includes a second bit pattern, and the second bit pattern is a bit pattern corresponding to the second code block; and the template bit pattern further includes a second template bit pattern, and the second template bit pattern corresponds to the second bit pattern.

In a possible implementation, the second template bit pattern is a template bit pattern corresponding to any one of the following code blocks: a second boundary code block, an idle code block, a sequence code block, a signal code block, or an error code block.

In some embodiments of this application, the second code block may be a code block before the first code block. For example, the second code block may be a code block adjacent to the first code block and before the first code block.

In a possible implementation, the second bit pattern includes a pattern including a $0^{th}$ bit to a $9^{th}$ bit of the second code block, and a start bit of the second code block is the $0^{th}$ bit.

In some embodiments of this application, the $0^{th}$ bit and the $1^{st}$ bit of the second code block may be a synchronization header of the second code block. The $2^{nd}$ bit to the $9^{th}$ bit of the second code block may be a control block type field of the second code block.

In a possible implementation, the code block stream further includes a third code block, the to-be-identified bit pattern further includes a third bit pattern, and the third bit pattern is a bit pattern corresponding to the third code block; and the template bit pattern further includes a third template bit pattern, and the third template bit pattern corresponds to the third bit pattern.

In a possible implementation, the third template bit pattern is a template bit pattern corresponding to a data code block.

In some embodiments of this application, the third code block may be a code block after the first code block. For example, the third code block may be a code block adjacent to the first code block and after the first code block.

In a possible implementation, the identifying of the first code block as the first boundary code block when the quantity of inconsistent bits is less than or equal to a first threshold includes: when the first bit pattern is consistent with the first template bit pattern, and the quantity of inconsistent bits is less than or equal to the first threshold, identifying the first code block as the first boundary code block.

In a possible implementation, the identifying of the first code block as the first boundary code block when the quantity of inconsistent bits is less than or equal to a first threshold includes: determining a second bit pattern, where the second bit pattern is a bit pattern corresponding to a second code block; comparing the second bit pattern with a second template bit pattern; and when the quantity of inconsistent bits is less than or equal to the first threshold, and a quantity of inconsistent bits between the second bit pattern and the second template bit pattern is less than or equal to a second threshold, identifying the first code block as the first boundary code block.

In some embodiments of this application, when the quantity of inconsistent bits between the to-be-identified bit pattern and the template bit pattern is less than or equal to the first threshold, and when the quantity of inconsistent bits between the second bit pattern and the second template bit pattern is less than or equal to the second threshold, the communication apparatus may identify the first code block as the first boundary code block.

For example, the communication apparatus may compare the to-be-identified bit pattern with the template bit pattern, for example, comparing the first bit pattern with the first template bit pattern, to obtain the quantity of inconsistent bits between the first bit pattern and the first template bit pattern. The communication apparatus may further compare the second bit pattern with the second template bit pattern to obtain the quantity of inconsistent bits between the second bit pattern and the second template bit pattern. When the quantity of inconsistent bits between the first bit pattern and the first template bit pattern is less than or equal to the first threshold, and when the quantity of inconsistent bits between the second bit pattern and the second template bit pattern is less than or equal to the second threshold, the first code block is identified as the first boundary code block. For example, the communication apparatus may first compare the to-be-identified bit pattern (for example, the first bit pattern) with the template bit pattern (for example, the first template bit pattern). When the quantity of inconsistent bits between the to-be-identified bit pattern and the template bit pattern is less than or equal to the first threshold, the communication apparatus compares the second bit pattern with the second template bit pattern. Therefore, when the quantity of inconsistent bits between the second bit pattern and the second template bit pattern is less than or equal to the second threshold, the first code block is identified as the first boundary code block.

In embodiments shown herein, the quantity of inconsistent bits between the second bit pattern and the second template bit pattern is not included in the first threshold.

For example, the second threshold may be 0, 1, or the like. This is not limited in embodiments of this application.

In a possible implementation, the identifying of the first code block as the first boundary code block when the quantity of inconsistent bits is less than or equal to a first threshold includes: determining a second bit pattern, where the second bit pattern is a bit pattern corresponding to a second code block; comparing the second bit pattern with a second template bit pattern; and when the quantity of inconsistent bits is less than or equal to the first threshold, and the second bit pattern is consistent with the second template bit pattern, identifying the first code block as the first boundary code block.

In some embodiments of this application, whether the first code block is the first boundary code block is further be determined by determining whether the second bit pattern is a control code block, thereby further improving accuracy and reliability of identifying the first code block as the first boundary code block, and ensuring system fault tolerance. It may be understood that for descriptions of the second bit pattern and the second template bit pattern, refer to the foregoing descriptions of embodiment corresponding to the second threshold. Details are not described herein again.

In a possible implementation, the identifying of the first code block as the first boundary code block when the quantity of inconsistent bits is less than or equal to a first threshold includes: determining a third bit pattern, where the third bit pattern is a bit pattern corresponding to a third code block; comparing the third bit pattern with a third template bit pattern; and when the quantity of inconsistent bits is less than or equal to the first threshold, and a quantity of inconsistent bits between the third bit pattern and the third template bit pattern is less than or equal to a second threshold, identifying the first code block as the first boundary code block.

It may be understood that for a description of the third code block, refer to the foregoing description of the second code block. Details are not described herein again. For example, the third code block may be a data code block.

In a possible implementation, after the identifying the first code block as the first boundary code block, the method further includes: determining a first code group from the code block stream based on the first code block, where the first code group starts with the first code block.

In a possible implementation, the first code group includes 195 data code blocks and one end code block.

In some embodiments of this application, the S code block is identified, so that the communication apparatus can demultiplex a plurality of first slots corresponding to a code group starting with the S code block, to obtain client signals corresponding to the plurality of first slots. This is not only simply in implementation, but also can ensure reliability of identifying the code group.

In a possible implementation, the first code group carries T client signals, and T is a positive integer.

In some embodiments of this application, the first code group may carry the T client signals. However, in specific implementation, the first code group may not carry a client signal or the like. This is not limited in embodiments of this application.

In a possible implementation, T=24.

According to a second aspect, this application provides a communication apparatus, configured to perform the method in any one of the first aspect or the possible implementations of the first aspect. The communication apparatus includes corresponding units for performing the method in any one of the first aspect or the possible implementations of the first aspect.

For example, the communication apparatus may include a transceiver unit and a processing unit.

According to a third aspect, this application provides a communication apparatus. The communication apparatus includes a processor, and the processor may be configured to perform the method in any one of the first aspect or the possible implementations of the first aspect.

In a process of performing the foregoing method, the process of receiving the code block (or the code block stream) or the like in the foregoing method may be understood as a process of receiving an input code block (or a code block stream) by the processor. When the processor receives the input code block (or the code block stream), a transceiver receives the code block (or the code block stream), and inputs the code block (or the code block stream) into the processor. Further, after the transceiver receives the code block (or the code block stream), other processing may need to be performed on the code block (or the code block stream), and then the code block (or the code block stream) is input into the processor.

Unless otherwise specified, or if operations such as transmitting, sending, and receiving related to the processor do not contradict an actual function or internal logic of the operations in related descriptions, all the operations may be more generally understood as operations such as outputting, receiving, and inputting of the processor, instead of operations such as transmitting, sending, and receiving directly performed by a radio frequency circuit and an antenna.

In an implementation process, the processor may be a processor specially configured to perform these methods, or a processor, for example, a general-purpose processor, that executes computer instructions in the memory to perform these methods. The memory may be a non-transitory memory, for example, a read-only memory (ROM). The memory and the processor may be integrated on a same chip, or may be separately disposed on different chips. A type of the memory and a manner of disposing the memory and the processor are not limited in some embodiments of this application.

In a possible implementation, the memory is located outside the communication apparatus.

In a possible implementation, the memory is located inside the communication apparatus.

In some embodiments of this application, the processor and the memory may alternatively be integrated into one component. In other words, the processor and the memory may alternatively be integrated together.

In a possible implementation, the communication apparatus further includes a transceiver. The transceiver is configured to receive signals and/or send signals.

For example, the transceiver may be configured to receive a code block stream or the like.

According to a fourth aspect, this application provides a communication apparatus. The communication apparatus includes a logic circuit and an interface, and the logic circuit is coupled to the interface. The interface is configured to obtain a code block stream (or may also be referred to as an input code block stream). The logic circuit is configured to: determine a to-be-identified bit pattern and compare the to-be-identified bit pattern with a template bit pattern to obtain a quantity of inconsistent bits; and when the quantity of inconsistent bits is less than or equal to a first threshold, identify a first code block as a first boundary code block.

It may be understood that for a specific implementation of the logic circuit, refer to the apparatus embodiment shown below. Details are not described herein again. For descriptions of the first code block, the to-be-identified bit pattern, the template bit pattern, and the like, refer to other embodiments of this application. Details are not described herein again.

According to a fifth aspect, this application provides a computer-readable storage medium. The computer-readable storage medium is configured to store a computer program, and when the computer program is run on a computer, the method in any one of the first aspect or the possible implementations of the first aspect is performed.

For example, when the foregoing computer program is run on a communication apparatus (for example, a receive end), the method shown in any one of the first aspect or the possible implementations of the first aspect is performed.

According to a sixth aspect, this application provides a computer program product. The computer program product includes a computer program or computer code, and when the computer program product is run on a computer, the method in any one of the first aspect or the possible implementations of the first aspect is performed.

According to a seventh aspect, this application provides a computer program. When the computer program is run on a computer, the method in any one of the first aspect or the possible implementations of the first aspect is performed.

BRIEF DESCRIPTION OF DRAWINGS

FIG. 5a shows different code type definitions of a 64B/66B code block according to an embodiment of this application;

DESCRIPTION OF EMBODIMENTS

Figure 1:
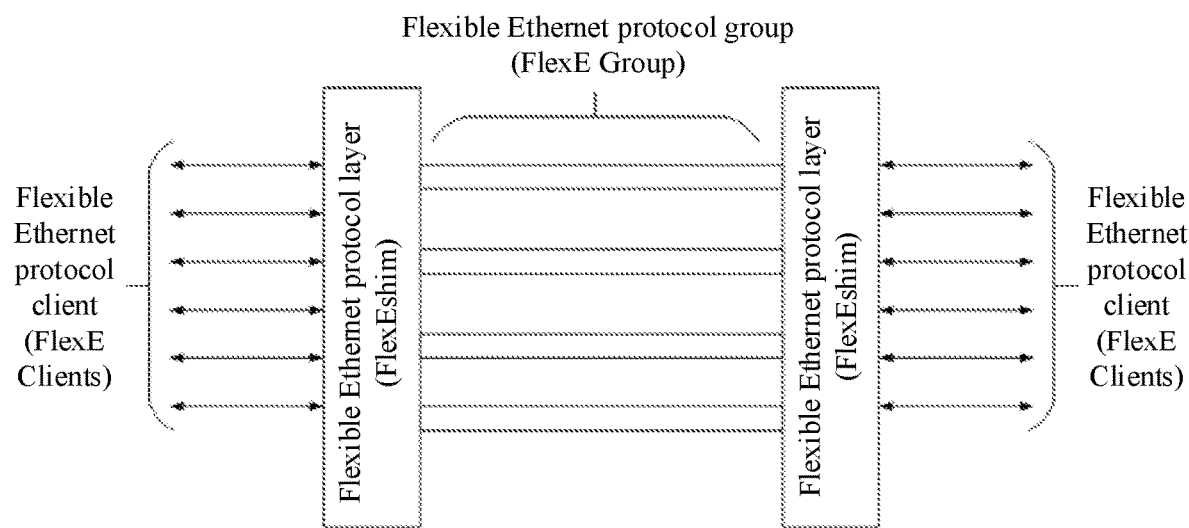
FIG. 1 is a schematic diagram of a communication system based on a flexible Ethernet protocol according to an embodiment of this application.

To make objectives, technical solutions, and advantages of this application clearer, the following further describes this application with reference to the accompanying drawings.

In the specification, claims, and the accompanying drawings of this application, terms such as "first" and "second" are only intended to distinguish between different objects but do not describe a particular order. In addition, terms "include", "have", or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

An "embodiment" mentioned in this specification means that a particular feature, structure, or characteristic described with reference to some embodiments may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In this application, "at least one (item)" means one or more, "a plurality of" means two or more, "at least two (items)" means two, three, or more, and "and/or" is used to describe an association relationship between associated objects, and indicates that three relationships may exist. For example, "A and/or B" may represent three cases: Only A exists, only B exists, and both A and B exist. A and B may be singular or plural. The character "/" generally indicates an "or" relationship between the associated objects. "At least one of the following items (pieces)" or a similar expression thereof means any combination of these items. For example, at least one of a, b, and c may represent a, b, c, "a and b", "a and c", "b and c", or "a, b, and c".

The following describes terms in this application in detail.

1. Flexible Ethernet (FlexE)

An optical internet forum (OIF) releases a flexible Ethernet (FlexE). The FlexE is a general technology that supports different Ethernet media access control (MAC) layer rates. A concept of a flexible Ethernet bundling group (which may also be referred to as a FlexE group or a bundling group for short) is introduced into the FlexE. A bundling group may be formed by bundling one or more physical layer apparatuses (which may also be considered as physical link interfaces and may be denoted as PHYs). A bandwidth resource corresponding to one bundling group is a sum of bandwidth resources corresponding to PHYs in the bundling group. Therefore, the FlexE can meet a higher transmission rate and a larger transmission bandwidth based on the bundling group.

FIG. 1 is a schematic diagram of an example of a communication system based on a flexible Ethernet protocol. In FIG. 1, an example in which one bundling group includes four PHYs is used. The FlexE divides a bandwidth resource of each PHY into a plurality of slots in a time division multiplexing (TDM) manner, to implement hard isolation of transmission pipeline bandwidths. A flexible Ethernet client (FlexE Client) transmits a service flow in a specified slot (one or more slots) in the bundling group. One bundling group can carry a plurality of flexible Ethernet clients, and one flexible Ethernet client corresponds to one service flow (typically, may be referred to as a medium access control (MAC) client). A flexible Ethernet protocol functional (also referred to as a FlexE shim) layer provides data adaptation and conversion from the flexible Ethernet protocol client to the MAC client.

The FlexE may support functions such as bonding, sub-rating, and channelization by bonding a plurality of PHYs. For example, the FlexE may bond a plurality of 100-bit Ethernet (GE) PHY ports, and divide each 100GE port into 20 slots at a granularity of 5G in time domain. The FlexE may support services at different Ethernet MAC rates. For example, a 200G MAC service is supported in a 2×100GE bundling group, that is, the FlexE bonds a plurality of Ethernet ports into one bundling group to support a MAC service whose rate is higher than that of a single Ethernet port, that is, the FlexE supports a bundling function. For another example, transmission of a 50G MAC service in a 100GE bundling group is supported, that is, a MAC service whose rate is less than a bandwidth of the bundling group or less than a bandwidth of the single Ethernet port is supported by allocating a slot to the service, that is, the FlexE supports a sub-rating function. For another example, one 150 G MAC service and two 25 G MAC services can be simultaneously transmitted in a 2×100 GE bundling group, that is, a plurality of MAC services can be simultaneously transmitted in the bundling group by allocating slots to the services, that is, the FlexE supports a channelization function.

It can be learned that the FlexE technology enables a plurality of service flows to be transmitted concurrently by using the bundling group. Service data of a same service flow may be carried on one PHY in the bundling group, or may be carried on different PHYs in the bundling group. In other words, service data of a same service flow may be transmitted to a peer end by using one PHY in the bundling group, or may be transmitted to a peer end by using a plurality of PHYs in the bundling group. A bandwidth resource of one PHY is usually divided into a plurality of slots. In actual use, a code block stream corresponding to a service may be allocated to a corresponding slot according to a slot configuration table. It may be understood that the bandwidth resource of one PHY shown herein is usually divided into a plurality of slots, and the slot may be understood as a second slot.

It may be understood that the bundling group shown in this application may also be referred to as a link group or the like, and the service flow shown in this application may also be referred to as a data flow or the like. The name of the bundling group or the like is not limited in this application. It may be understood that the service flow shown herein may also be understood as a client signal or the like shown below.

2. Metro Transport Network (MTN)

Figure 2:
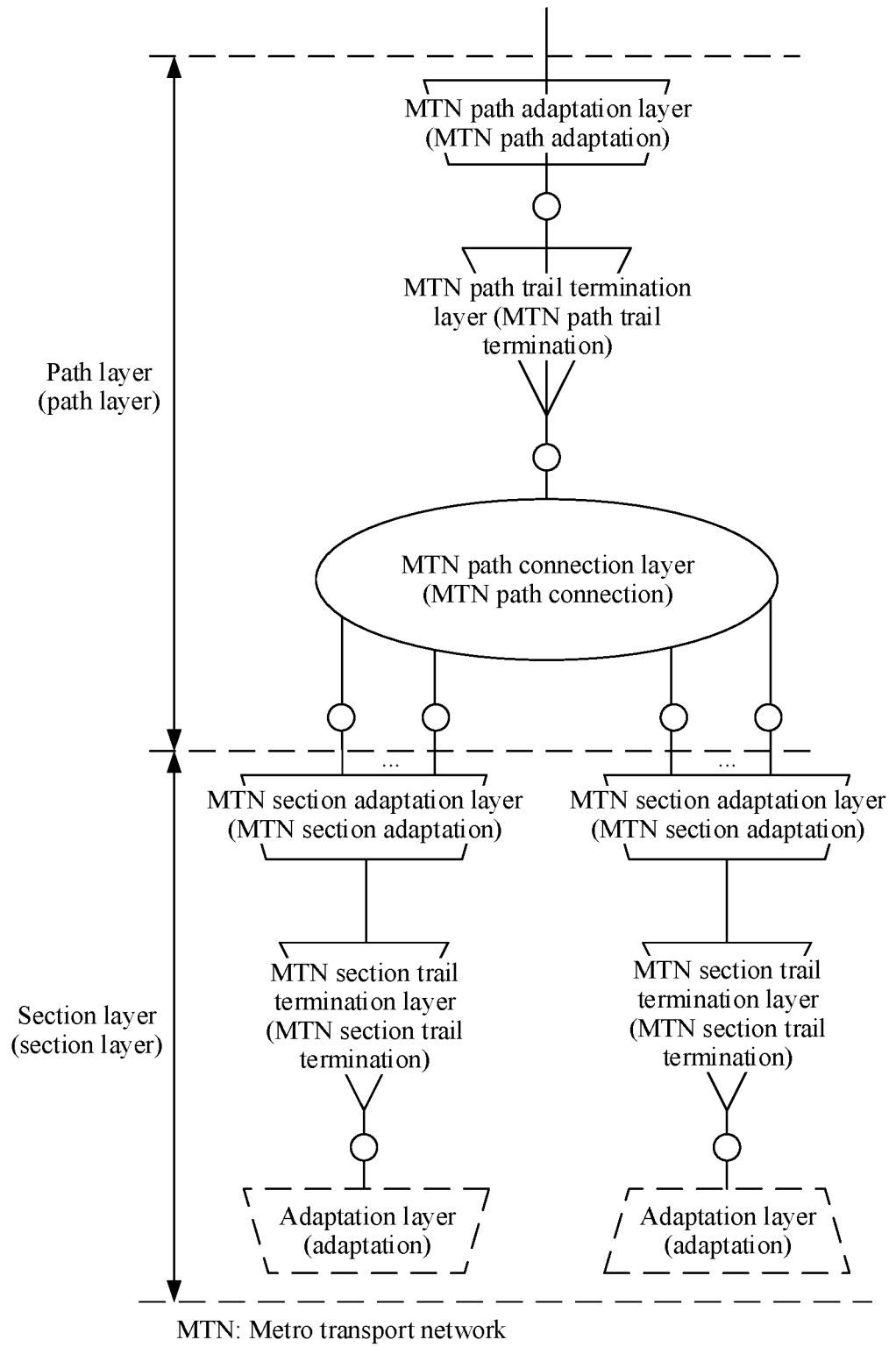
FIG. 2 is a schematic diagram of an MTN network architecture according to an embodiment of this application.

The MTN is a next-generation transport network technology system defined by the International Telecommunication Union (ITU-T) based on FlexE design logic to meet requirements of new services such as 5G. For example, as shown in FIG. 2, the MTN may include an MTN path layer and an MTN section layer. The MTN path layer includes an MTN path adaptation layer, an MTN path trail termination layer, an MTN path connection layer, and the like. The MTN section layer includes an MTN section adaptation layer and an MTN section trail termination layer. Optionally, the MTN section layer may further include an adaptation layer.

It may be understood that the MTN path adaptation layer, the MTN path trail termination layer, the MTN path connection layer, or the MTN section trail termination layer may also have other names. For example, the MTN path adaptation layer may also be referred to as an MTN path adaptation function module. This is not limited in this application. For a description of a bundling group in the MTN, refer to the description of the bundling group in the FlexE. Details are not described herein again.

For example, a service flow obtained by a transmit end may pass through a MAC, and enter the MTN path adaptation layer in an MTN domain, to be adapted into a form of a 64B/66B code block stream. After the 64B/66B code block stream enters the MTN path trail termination layer, path layer operation, administration, and maintenance (OAM) information is inserted into the 64B/66B code block stream, and the OAM information includes a bit interleaved parity (BIP) result. Then, the transmit end may perform path forwarding by using the MTN path connection layer, that is, determine a correspondence between an ingress port and an egress port at the MTN path connection layer, to determine the egress port. The MTN section adaptation layer (MTN section adaptation) has a path layer-to-section layer adaptation function, and each MAC service flow (for example, in a form of a 64B/66B code block) may be interleaved at the MTN section adaptation layer, to form the 64B/66B code block stream. Then, the 64B/66B code block stream may enter a physical layer for transmission through the MTN section trail termination layer, the adaptation layer, or the like. For example, functions such as scrambling, path distribution, alignment marker (AM) insertion, and the like may alternatively be performed on the 64B/66B code block stream.

On the contrary, after a receive end receives the 64B/66B code block stream, a flow direction of the 64B/66B code block stream received by the receive end is opposite to a flow direction of the 64B/66B code block stream sent by the transmit end. For example, the 64B/66B code block stream received by the receive end may successively pass through, for example, the MTN section layer, the MTN path layer, and the like.

Roughly from a perspective of a protocol stack, the MTN section layer is functionally similar to the OIF FlexE shim. A current version of the MTN section layer reuses and is compatible with the FlexE, and a frame format of the current version of the MTN section layer retains a FlexE frame format. It may be understood that for specific descriptions of MAC, reconciliation sublayer (RS), physical coding sublayer encoding/decoding (PCS encoding/decoding), and the like, refer to the Ethernet model of IEEE802.3.

3. MTN Flexible Finer-Granularity (Fg) Layer

Figure 3:
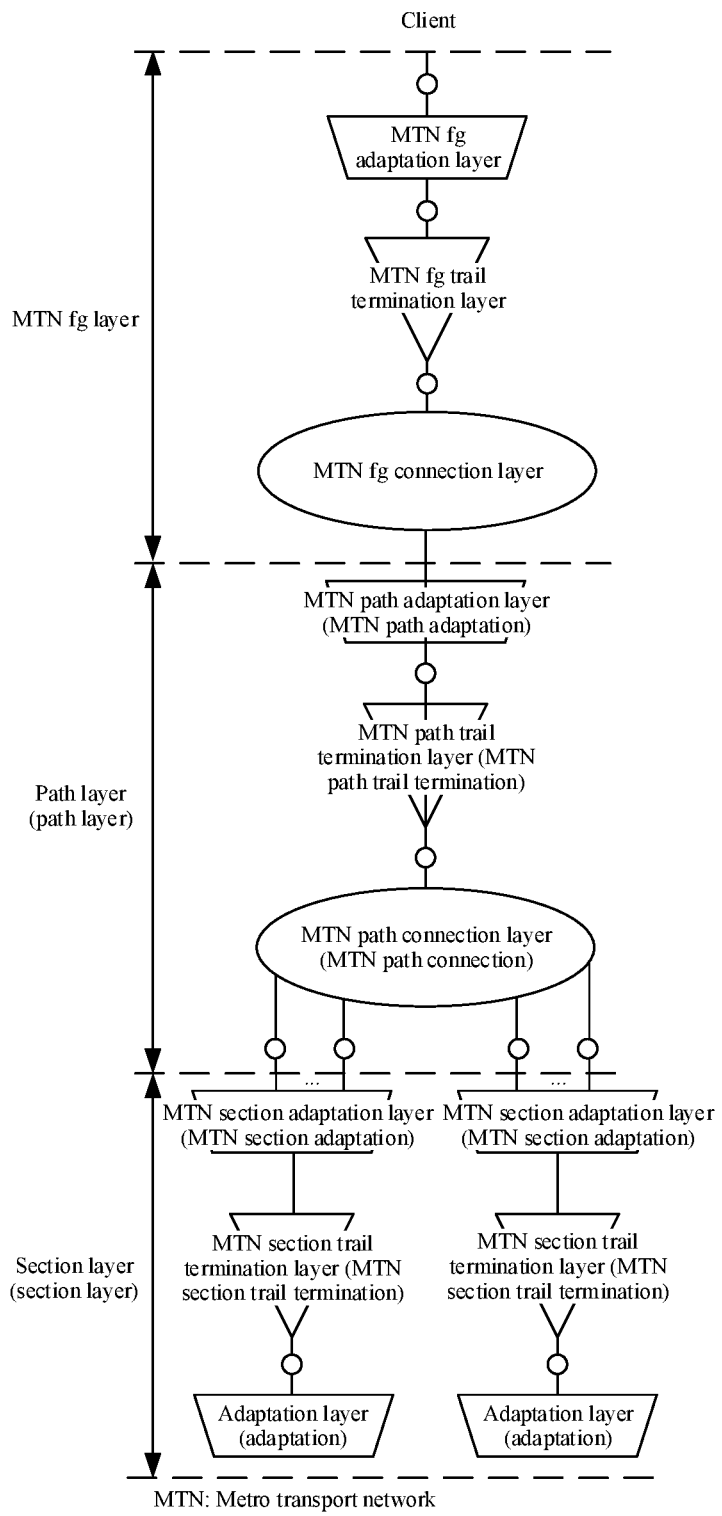
FIG. 3 is a schematic diagram of another MTN network architecture according to an embodiment of this application.

In FIG. 3, a client signal passes through an MTN fg adaptation layer and forms a code group stream. When the code group stream passes through an MTN fg trail termination layer, the code group stream may be inserted with OAM information or the like (or may also be understood as being inserted with overhead information). Then, the transmit end determines a correspondence between an ingress and an egress port at the MTN fg connection layer, to determine the egress port. For example, at the MTN fg layer, for example, the MTN fg trail termination layer, the code group stream may be transmitted through a first path. Then, at the MTN path layer, for example, the MTN path adaptation layer, one or more first paths may multiplex one or more first slots obtained through division from a second path. At the MTN path trail termination layer, overhead information such as OAM may be inserted into one second path, and at the MTN section adaptation layer, one or more second paths multiplex one or more second slots obtained through division from the bundling group. That is, at the MTN section layer, one second path may be mapped to one or more second slots. It may be understood that for specific descriptions of the MTN path layer and the MTN section layer, refer to FIG. 2. Details are not described herein again.

In this application, a code group is encapsulated in the form of a code block. Therefore, when the code group stream passes through the MTN path layer and the MTN section layer, the MTN path layer and the MTN section layer detects the code block stream, and the code block stream is sent to a link through a physical layer.

After receiving the code block stream, the receive end may demultiplex the second path from the one or more second slots in the bundling group at the MTN section adaptation layer. The MTN path adaptation layer demultiplexes the first path from the one or more first slots in the second path. Therefore, the receive end may restore a client signal flow from the first path at the MTN fg layer. It may be understood that, because a flow direction in which the receive end obtains the client signal flow is opposite to a flow direction in which the transmit end sends the client signal flow, a specific manner in which the receive end obtains the client signal flow may further be described as the code block stream sent by the transmit end. Details are not described herein again.

4. First Slot

Figure 4:
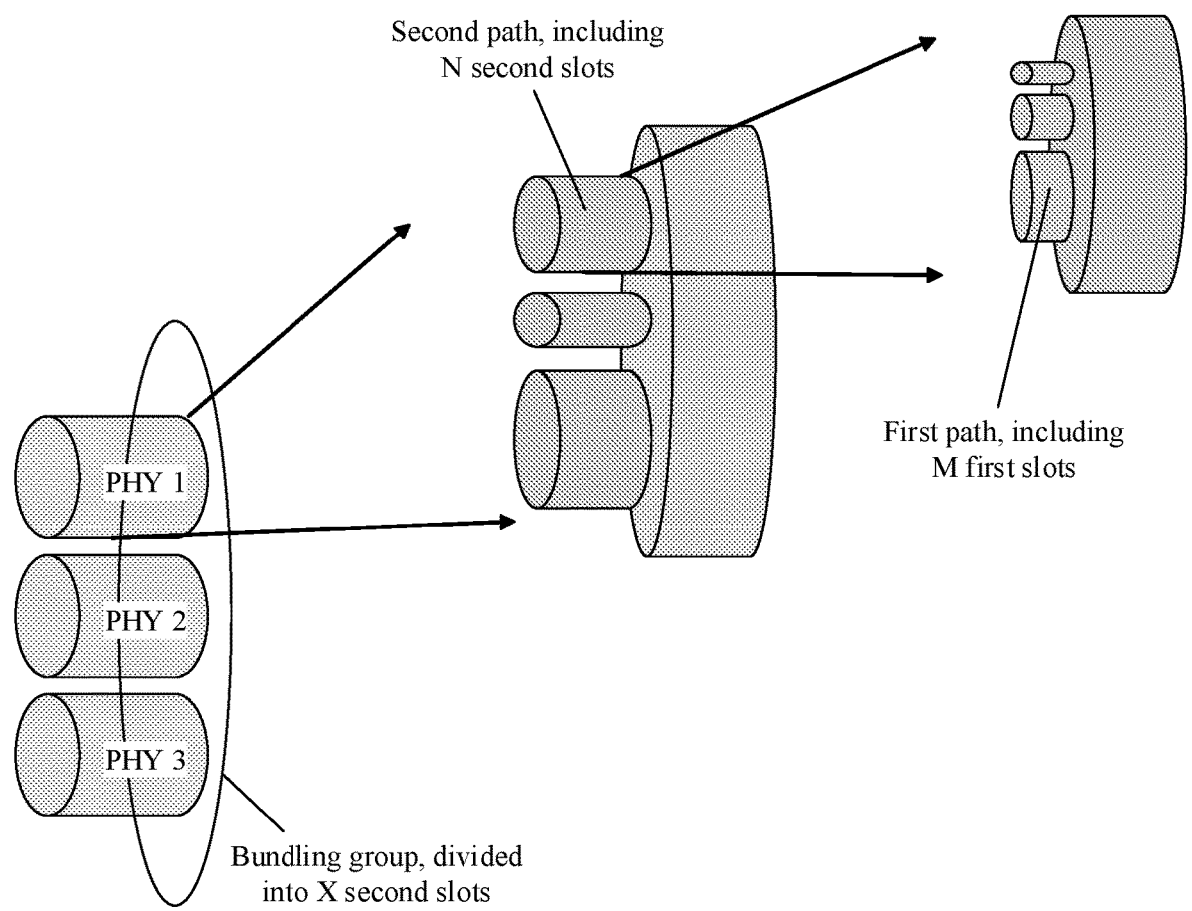
FIG. 4 is a schematic diagram of a relationship between a first path and a second path according to an embodiment of this application.

It can be learned from the foregoing description that a slicing packet network (SPN), an MTN, or the like provides an n×5 Gbps bandwidth-based hard pipe, and n is a positive integer. However, for some services, a granularity of the 5 Gbps pipe bandwidth is still too large. To resolve a problem that the pipe bandwidth granularity is excessively large, this application further provides a finer-granularity pipe. As shown in FIG. 4, based on the 5 Gbps pipe, according to the method provided in this application, further slot division may be performed on the 5 Gbps, for example, a slot of 5 Gbps is divided into 480 10 Mbps. In this case, one 10 Mbps may correspond to one client signal, a plurality of 10 Mbps may correspond to one client signal, or the like. This is not limited in this application. The 5 Gbps shown herein may also be understood as a second slot. In other words, the second slot may be divided into a plurality of first slots. As shown above, the second slot may be divided into 480 first slots. It may be understood that the first slot may include not only 10 Mbps, but also 100 Mbps, 7.5 Mbps, 5 Mbps, 2.5 Mbps, or the like, and the second slot may include not only 5 Gbps, but also 10 Gbps, 25 Gbps, or the like. This is not limited in this application. It may be understood that, in specific implementation, a deviation from the examples discussed above may further exist in a bandwidth of each slot. Therefore, a specific value of a bandwidth of the first slot or a specific value of a bandwidth of the second slot is not limited in this application. For example, when the bandwidth of the first slot is 10 Mbps, in specific implementation, the bandwidth of the first slot may alternatively be 10.1 Mbps, 10.2 Mbps, or the like.

The following describes in detail the bundling group, the first slot, and the second slot that are shown in this application.

In this application, the bundling group may be formed by bundling one or more PHYs, and a bandwidth of the bundling group is a sum of bandwidths of the one or more PHYs. Further, the bundling group may be divided into X second slots. The second path may include N second slots in the X second slots, and the second path may be divided into Y first slots. The first path may include M first slots in the Y first slots. N is less than or equal to X, M is less than or equal to Y, and M, N, X, and Y are all integers greater than or equal to 1.

In other words, in this application, the first path includes M first slots, the M first slots are included in the second path, the second path includes N second slots, the N second slots are included in the bundling group, and the bundling group includes one or more PHY links. The second path is divided into Y first slots, the M first slots are included in the Y first slots, the bundling group is divided into X second slots, and the N second slots are included in the X second slots. Optionally, the bandwidth of the first slot in this application may be 10 Mbps x K, K is an integer greater than or equal to 1, and K is less than or equal to 2048.

The first path may be understood as a path used to transmit a code group, and the second path may be understood as a path used to transmit a code block. When transmitting the code group, the first path may multiplex the M first slots in the Y first slots obtained through division from the second path. In other words, a slot granularity of the first path shown in this application is smaller, and the slot granularity in the transport network technology is smaller and more flexible than that in the MTN. For example, the first path may be used to transmit a leased line service, or the like. For another example, the first path may be used to transmit one or more different client signals, or the like. It may be understood that the first path may be used to transmit the code group (for example, a first code group) shown in this application, and the code group may be transparently transmitted in the MTN network.

For example, as shown in FIG. 4, one PHY in the bundling group may include three second paths, and second slots included in the second path are included in the bundling group. One second path may include three first paths. For example, the M first slots included in the first path are included in the second path. It may be understood that FIG. 4 is merely an example, and should not be understood as a limitation to this application.

In this application, the first path may also be referred to as a flexible finer-granularity basic unit (fgBU) path (or an MTN fg (finer-granularity) path), a flexible finer-granularity path (or a fine granularity path), a low-order path, or the like, and the second path may also be referred to as a large-granularity path, a high-order path, or the like. A name thereof is not limited in this application.

5. Code Block

A P1B/P2B code block is a coding scheme, and may also be referred to as a P1B/P2B bit block, a P1B/P2B block, a P1B/P2B coding block, a P1B/P2B bit stream, a P1/P2 (or P1b/P2b) bit block, or the like. P1 represents a quantity of payload bits in a code block (or a bit block). P2 represents a total quantity of bits of the code block, P2-P1 represents a quantity of bits of a synchronization header in the code block, P1 and P2 are positive integers, and P2 is greater than P1. For example, the P1B/P2B code block may be an 8B/10B code block, a 64B/66B code block, a 128B/130B code block, a 256B/258B code block, or the like. Specific values of P1 and P2 are not limited in this application.

The following uses the 64B/66B code block as an example to describe the methods provided in this application. It may be understood that the 64B/66B code block shown below may alternatively be replaced with a 64B/66B bit block, a 64/66 code block, a 64/66 bit block, a 64b/66b code block, a 64b/66b bit block, a 64B/66B bit block stream, a 64B/66B coding block, or the like.

For example, FIG. 5a shows different code type definitions of the 64B/66B code block. As shown in FIG. 5a, 2 bits "10" or "01" at the start are synchronization header bits, and the following 64 bits are payload bits, and may be used to carry payload data or the like. In FIG. 5a, each row represents one code type definition. D0 to D7 represent data bytes, C0 to C7 represent control bytes, S0 represents a start of a MAC frame, and T0 to T7 represent an end of the MAC frame.

In different code blocks shown in FIG. 5a, when the synchronization header bit is 0b10, a corresponding code block may be referred to as a control code block. The control code block is a control code type defined in the foregoing P1B/P2B code block. For example, the synchronization header of the control code block may be "10", and the control code block may further include a control block type field.

For example, when the control block type field of the control code block defined in 64B/66B is 0x78, the control code block may be a start code block.

For another example, when the control block type field of the control code block defined in 64B/66B is 0xFF, the control code block may be an end code block. It may be understood that only an example of the end code block is shown herein. In the code block shown in FIG. 5a, a control block type field of the end code block may alternatively be 0x87, 0x99, or the like. Details are not described herein again. A control block type field of a second boundary code block shown below in this application may be not only 0xFF, but may also 0x87, 0x99, 0xAA, 0xB4, 0xCC, 0xD2, 0xE1, or the like. The control block type field of the second boundary code block is not limited in this application.

For another example, when the control block type field of the control code block defined in 64B/66B is 0x4B, the control code block may be a sequence (sequence ordered set, 0) code block, may also be referred to as a signal (signal ordered set, 0) code block, or the like. For example, the sequence code block may indicate a link status, and the signal code block may indicate information about a special signal. A difference between the sequence code block and the signal code block is not limited in this application. In the following, an 0 code block is used to represent the sequence code block or the signal code block.

For another example, when the control block type field of the control code block defined in 64B/66B is 0x1E, the control code block may be an idle code block or an error code block. Whether the control code block is the idle code block or the error code block may be determined based on a value of the first control byte following the control block type field. For example, when the first control byte is 0x1E, the control code block is the error code block, and when the first control byte is 0x00, the control code block may be the idle code block.

6. Boundary Code Block

The boundary code block may be used to identify a start or an end of a data code block. In this application, the boundary code block may include a first boundary code block and/or a second boundary code block.

Generally, a preamble and/or a start of frame delimiter (SFD) in a packet may be encoded as a start code block. In addition, to identify an end of the packet, one end code block may be added after the last data code block during encoding (or, the end code block may also be used to carry data and the like). That is, the start code block and the end code block shown herein may be used to define at least one data code block. For example, the start code block and the end code block may be used to define 195 data code blocks. Alternatively, the start code block and the end code block may be used to define 33 data code blocks or the like. Descriptions of the start code block and the end code block shown herein are merely examples. For example, the first boundary code block may be a start code block of a first code group, and an end code block of the first code group may be a third boundary code block (namely, the end code block). For another example, the second boundary code block may be an end code block of a second code group, and a start code block of the second code group may be a fourth boundary code block, and the like. The start code block of the second code group is not limited in this application.

For example, a client signal shown below may be in a form of a packet. For example, a MAC frame (that is, a MAC frame) stream shown below may also be referred to as a packet flow or the like. This is not limited in this application.

7. Code Group (or Block Group)

The following describes an example of a structure of the code group shown in this application.

In a first manner, the code group may include one start code block, one or more data code blocks, and one end code block. For example, a start part of the code group is the start code block, and an end part may be the end code block, or the end part may be another control code block or the like.

Figure 5B:
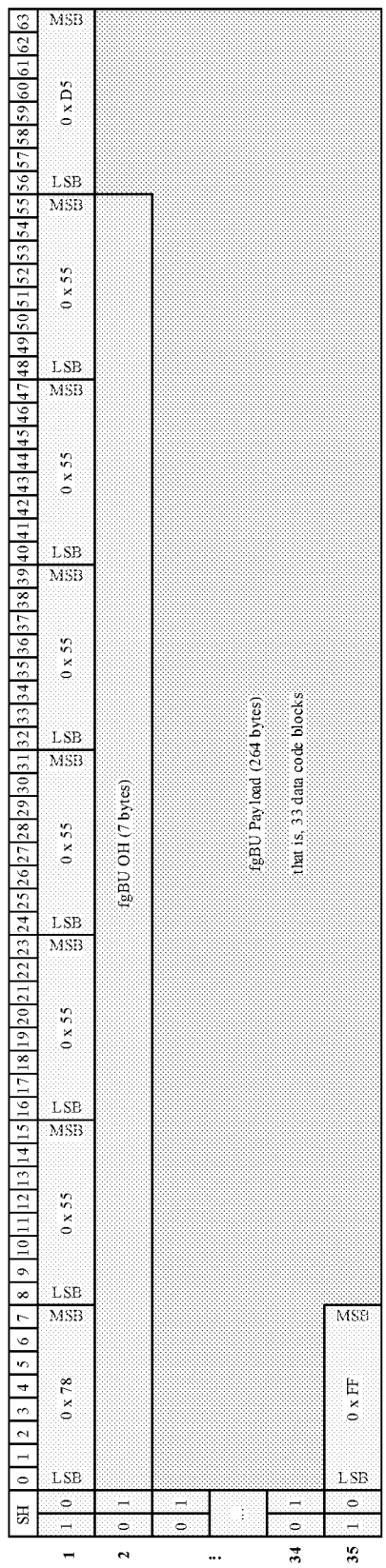
FIG. 5b and FIG. 5c are schematic diagrams of a structure of a code group according to an embodiment of this application.

For example, FIG. 5b is a schematic diagram of a structure of the code group shown in this application. The code group may include one start code block, one end code block, and 33 data code blocks. Because the end code block shown in FIG. 5b is 0xFF, a $0^{th}$ control byte (for example, a D0 byte in FIG. 5a) to a $6^{th}$ control byte (for example, a D6 byte in FIG. 5a) of the end code block may be used to carry data. Therefore, a load part shown in FIG. 5b may carry 33 data code blocks.

In a second manner, the code group may include one start code block and one end code block, and further include one or more 64B/65B data code blocks obtained by encoding the 64B/66B data code block. It may be understood that the 64B/65B data code block is included in the payload part of the code group. In other words, the 64B/65B data code block included in the payload part of the code group may be obtained by removing a 1-bit synchronization header from the 64B/66B data code block. Whether a $0^{th}$ bit or a $1^{st}$ bit is removed from the 64B/66B data code block is not limited in this application.

Figure 5C:
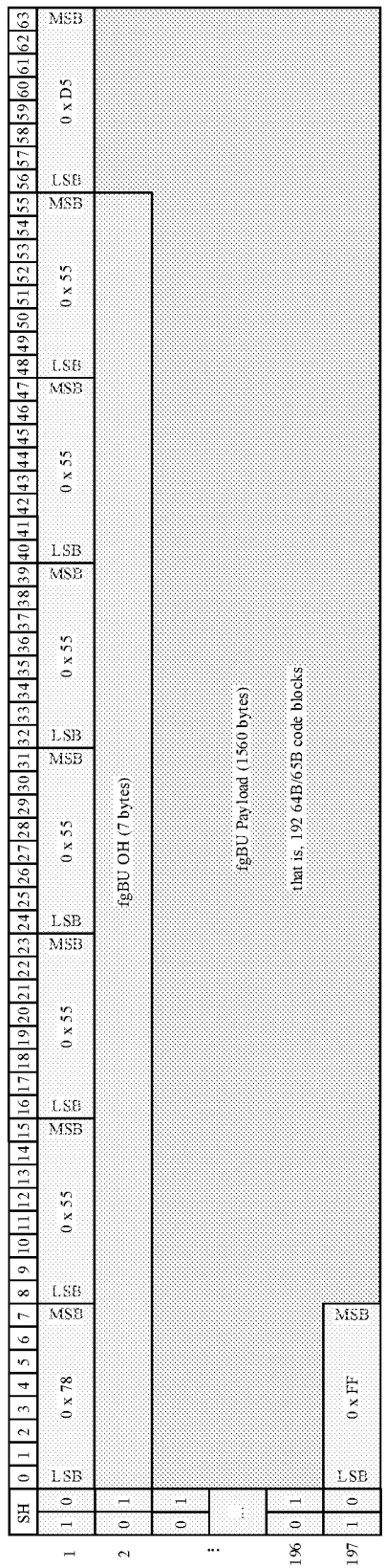

For example, FIG. 5c is a schematic diagram of a structure of another code group shown in this application. As shown in FIG. 5c, a $1^{st}$ row (that is, corresponding to the start code block in FIG. 5a) is a start code block in the code group, a $197^{th}$ row (that is, corresponding to the end code block in FIG. 5a) is an end code block in the code group, and a $198^{th}$ row is another control code block that is in the code block and that is after the end code block (the $198^{th}$ row is not shown in FIG. 5c). First seven bytes in a $2^{nd}$ row are used to carry overhead (overhead, OH) information. A code block starting from an $8^{th}$ byte in the $2^{nd}$ row to a $196^{th}$ row is the 64B/65B data code block, and is used to carry data information. According to a relationship between 65 and 64, the load part of the code group may be obtained by encoding 195 data code blocks. FIG. 5c shows that the load part is 1560 bytes. 1560 bytes=1560*8 bits=192 64B/65B. In addition, for 195 64B/66B data code blocks, there are 195*64=12480 bits=192*65 in total. Therefore, the code group shown in FIG. 5c may be understood as including one S code block, 195 D code blocks, and one T code block.

In this application, a length of the code group may be a preset length. For example, a length of a data code block in one code group may be 1560 bytes.

Figure 5D:
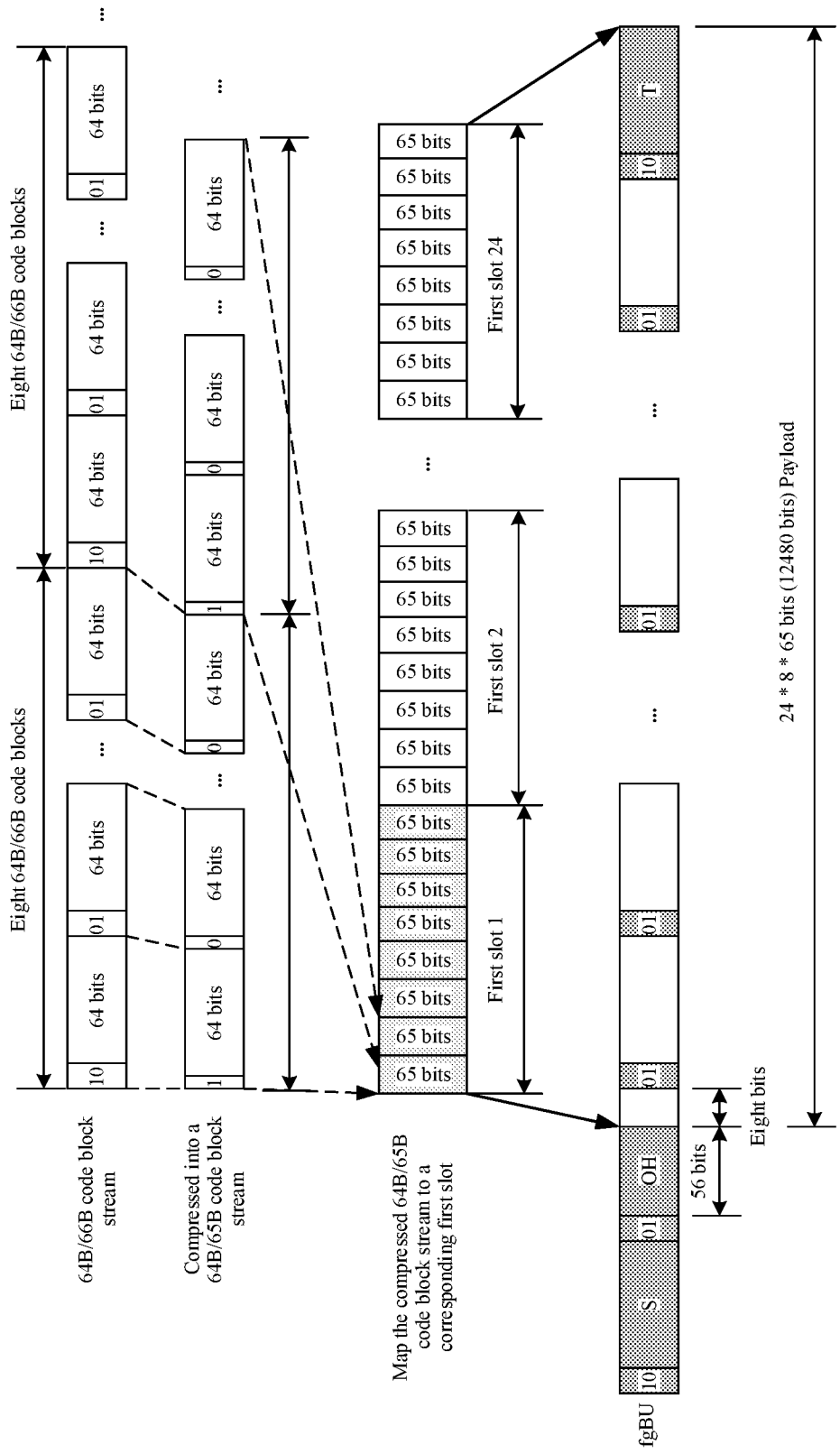
FIG. 5d is a schematic diagram of a code group encapsulation process according to an embodiment of this application.

As shown in FIG. 5d, after 64B/66B coding is performed on the client signal (for example, a MAC frame stream), a 64B/66B code block stream is formed. After 64B/65B compression (the 1-bit synchronization header is removed) is completed on the 64B/66B code block stream, a 64B/65B code block stream is formed. The 64B/65B code block stream may be mapped to one first slot based on every eight 64B/65B code blocks as one group.

In other words, this application shows that the first slot may include eight 64B/65B. Therefore, with reference to a structure of an fgBU shown in FIG. 5c, one fgBU may carry 24 first slots. Twenty fgBUs may form one complete multiplexing period, and the multiplexing period may include 480 slots. In this application, because the first slot may be used to carry one client signal, one fgBU may further carry a maximum of 24 client signals.

It may be understood that the code group shown in this application may also be referred to as a flexible finer-granularity basic unit (fgBU), a code block set, a code block cluster, or the like. A name of the code group shown in this application is not limited.

It may be understood that the length of the data code block included in the code group shown herein is merely an example. In specific implementation, the length of the data code block included in the code group may alternatively be another value or the like.

It may be understood that the description of the code group shown in this application is applicable to a first code group shown in the following. The first code group starts with a first code block, and the first code block may be an S code block.

8. To-be-Identified Bit Pattern and Template Bit Pattern

The to-be-identified bit pattern includes some or all bits of one or more code blocks.

Optionally, the to-be-identified bit pattern may include at least two bits of a first code block. For example, the to-be-identified bit pattern includes a first bit pattern, and the first bit pattern is a bit pattern including a $0^{th}$ bit to a $9^{th}$ bit of the first code block. For another example, the first bit pattern is a bit pattern including a $0^{th}$ bit to a $65^{th}$ bit of the first code block.

Optionally, the to-be-identified bit pattern includes at least two bits of a first code block and at least two bits of a second code block. For example, the to-be-identified bit pattern includes a first bit pattern and a second bit pattern, and the second bit pattern may be a bit pattern including a $0^{th}$ bit to a $9^{th}$ bit of the second code block, or the like.

Optionally, the to-be-identified bit pattern includes at least two bits of a first code block and at least two bits of a third code block. For example, the to-be-identified bit pattern includes a first bit pattern and a third bit pattern, and the third bit pattern may be a bit pattern including a $0^{th}$ bit and a $1^{st}$ bit of the third code block.

Optionally, the to-be-identified bit pattern includes at least two bits of a first code block, at least two bits of a second code block, and at least two bits of a third code block.

It may be understood that the first bit pattern, the second bit pattern, and the third bit pattern shown above are merely examples. In a specific implementation, the first bit pattern may alternatively be a bit pattern including a $0^{th}$ bit to a $17^{th}$ bit of the first code block, or the like. Alternatively, the second bit pattern may be a bit pattern including a $0^{th}$ bit to a $65^{th}$ bit of the second code block, or the like. This is not limited in embodiments of this application.

In this application, the to-be-identified bit pattern may be obtained by using a detection window. For example, the detection window may be used to detect whether the first code block is a first boundary code block.

Figure 8A:
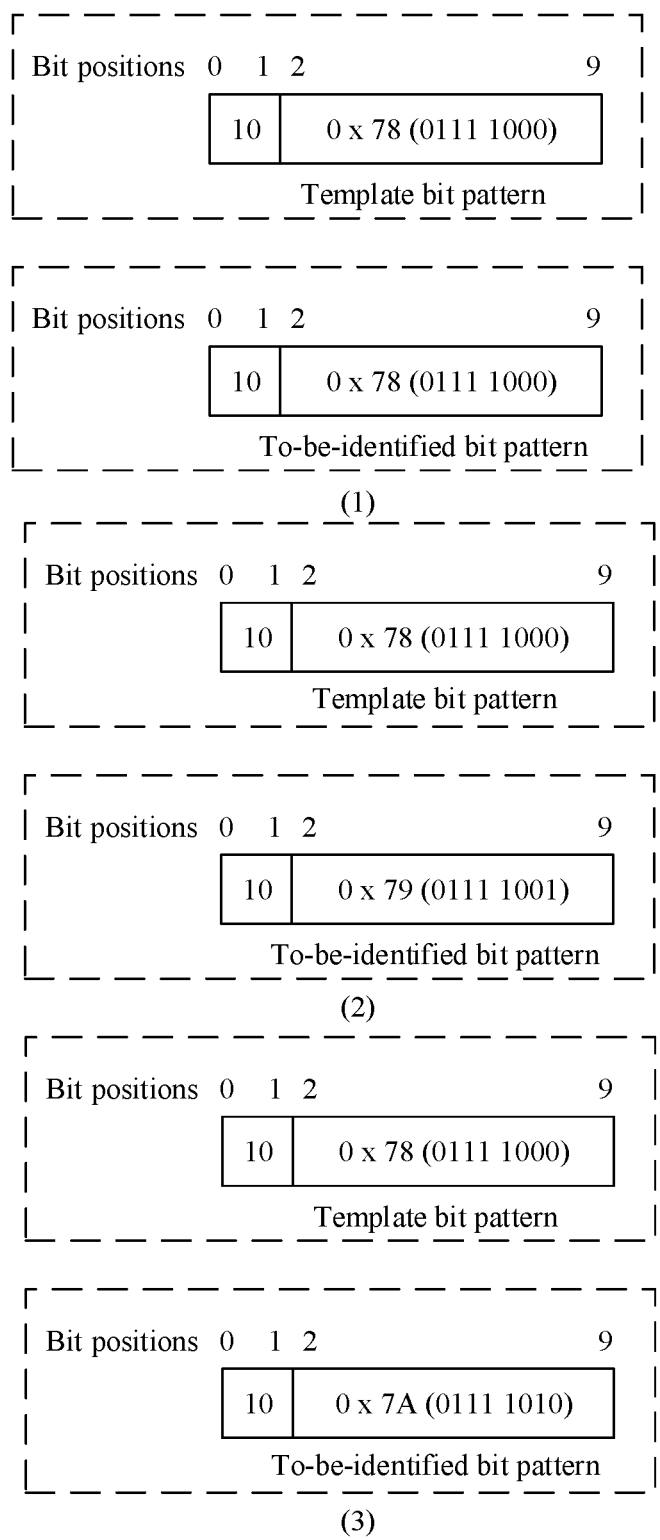
FIG. 8a is a schematic diagram of comparison between a template bit pattern and a to-be-identified bit pattern according to an embodiment of this application.

The template bit pattern is an expected bit sequence used to determine whether the first code block is the first boundary code block. For example, the template bit pattern may be understood as an expected bit sequence that appears in the detection window and that is used to determine whether the first code block is the first boundary code block. For example, the template bit pattern includes a first template bit pattern, and the first template bit pattern is used to identify the first bit pattern. In other words, a position of the first template bit pattern in the template bit pattern is in a one-to-one correspondence with a position of the first bit pattern in the to-be-identified bit pattern. For the correspondence between the to-be-identified bit pattern and the template bit pattern, refer to the description in FIG. 8a shown below.

For example, the first template bit pattern may be a template bit pattern corresponding to the start code block, and the second template bit pattern may be a template bit pattern corresponding to the end code block. In this case, for descriptions of the first template bit pattern and the second template bit pattern, refer to the embodiments shown below.

However, in this application, the first template bit pattern may alternatively be a template bit pattern corresponding to the end code block, the second template bit pattern may be a template bit pattern corresponding to the data code block, and the third template bit pattern may be a template bit pattern corresponding to the start code block. Alternatively, the third template bit pattern may be a template bit pattern corresponding to any one of an idle code block, an error code block, an O code block, or the like. In other words, the communication apparatus may identify, by using the second code block before the first code block or the third code block after the first code block, whether the first code block is the end code block. In this case, the first boundary code block is the end code block. It may be understood that for descriptions of the case where the first template bit pattern is the template bit pattern corresponding to the end code block, the second template bit pattern is the template bit pattern corresponding to the data code block, and the third template bit pattern is the template bit pattern corresponding to any one of the start code block, the idle code block, the error code block, or the O code block, refer to the following description of the case where the first template bit pattern is the template bit pattern corresponding to the start code block, the second template bit pattern is the template bit pattern corresponding to any one of the end code block, the idle code block, the error code block, or the O code block, and the third template bit pattern is the template bit pattern corresponding to the data code block.

It may be understood that the bit pattern shown in this application may also be referred to as a bit map, a bit string, a bit sequence, a bit mode, or the like. A name of the bit pattern is not limited in this application. In addition, the template bit pattern shown in this application may also be referred to as a preset bit pattern, a preset template, a preconfigured template, or the like. A name of the template bit pattern is not limited in this application. The to-be-identified bit pattern shown in this application may also be referred to as a to-be-verified bit pattern, a target bit pattern, or the like. A name of the to-be-identified bit pattern is not limited in this application.

The following describes the template bit pattern shown in this application with reference to the accompanying drawings.

In a possible implementation, the template bit pattern includes a first template bit pattern, and the first template bit pattern may be a template bit pattern corresponding to a first boundary code block. For example, the first boundary code block may be an S code block.

Figure 6A:
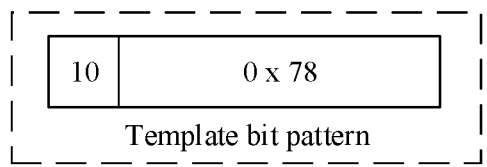
FIG. 6a and FIG. 6b are schematic diagrams of a template bit pattern according to an embodiment of this application.

Optionally, as shown in FIG. 6a, the first template bit pattern may include a template bit pattern corresponding to the $0^{th}$ bit to the $9^{th}$ bit of the S code block. That is, the first template bit pattern includes a synchronization header and a control block type field of the S code block.

Figure 6B:
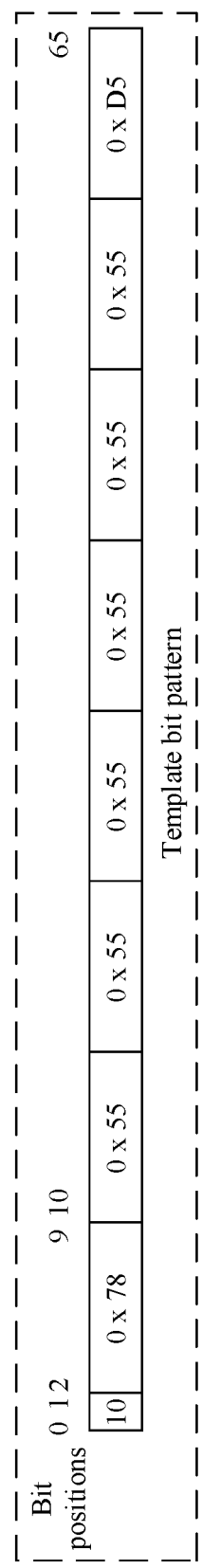

Optionally, the first template bit pattern may further include a template bit pattern corresponding to the $0^{th}$ bit to the $9^{th}$ bit of the S code block and any one of a first control byte (the D1 byte in FIG. 5a) to a seventh control byte (the D7 byte in FIG. 5*a*). As shown in FIG. 6*b*, the first template bit pattern may include the $0^{th}$ bit to the $65^{th}$ bit of the S code block.

Optionally, the first template bit pattern may further include a template bit pattern corresponding to the $2^{nd}$ bit to the $9^{th}$ bit of the S code block. The first template bit pattern may alternatively include a control block type field of the S code block, or the like.

In another possible implementation, the template bit pattern includes a first template bit pattern and a second template bit pattern. The second template bit pattern may be a template bit pattern corresponding to any one of the following code blocks: a second boundary code block (for example, a T7 code block), an idle code block, a sequence (sequence ordered set, O) code block, a signal (signal ordered set, O) code block, or an error code block. For a description of the first template bit pattern, refer to FIG. 6*a* and FIG. 6*b*. Details are not described herein again.

Figure 7A:
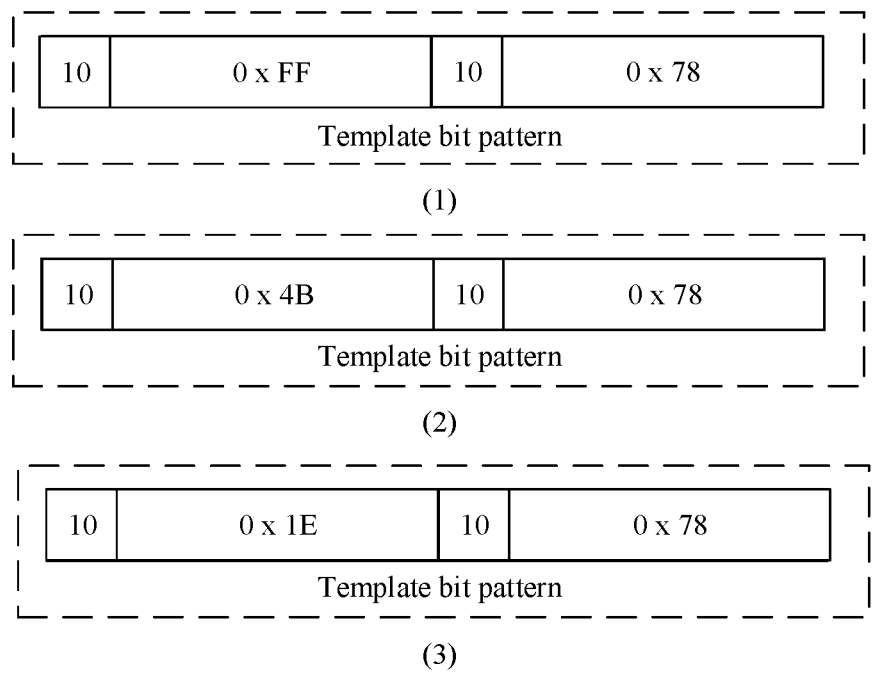
FIG. 7a to FIG. 7c are schematic diagrams of a template bit pattern according to an embodiment of this application.

Optionally, as shown in (1) in FIG. 7*a*, the template bit pattern may include a template bit pattern corresponding to the $0^{th}$ bit to the $9^{th}$ bit of a T code block and the $0^{th}$ bit to the $9^{th}$ bit of an S code block. For example, the template bit pattern may include a synchronization header and a control block type field of the T code block, and a synchronization header and a control block type field of the S code block.

It may be understood that the first template bit pattern may further include any one of the synchronization header or the control block type field of the S code block, and the second template bit pattern may further include any one of the synchronization header or the control block type field of the T code block. Therefore, the template bit pattern may include a template bit pattern corresponding to the control block type field of the T code block and the synchronization header and the control block type field of the S code block. Alternatively, the template bit pattern may include a template bit pattern corresponding to the control block type field of the T code block and the control block type field of the S code block. Alternatively, the template bit pattern may include a template bit pattern corresponding to the synchronization header and the control block type field of the T code block and the control block type field of the S code block. Alternatively, the template bit pattern may include a template bit pattern corresponding to the synchronization header of the T code block and the synchronization header and the control block type field of the S code block. Alternatively, the template bit pattern may include a template bit pattern corresponding to the synchronization header of the T code block and the synchronization header of the S code block. It may be understood that, for the description presented here, another code block shown below is also applicable, and details are not described again.

Optionally, as shown in (2) in FIG. 7*a*, the template bit pattern may include a template bit pattern corresponding to a synchronization header and a block type field of the O code block and the synchronization header and the block type field of the S code block.

Optionally, as shown in (3) in FIG. 7*a*, the template bit pattern may include a template bit pattern corresponding to a synchronization header and a block type field of the idle code block and the synchronization header and the block type field of the S code block. Alternatively, the template bit pattern shown in (3) in FIG. 7*a* may be further understood as a template bit pattern corresponding to a synchronization header and a block type field of the error code block and the synchronization header and the block type field of the S code block.

It may be understood that the first template bit pattern shown in this application may alternatively include the synchronization header of the S code block, the control block type field of the S code block, and the control byte of the S code block. As shown in FIG. 5*a*, values of the $0^{th}$ byte to the $7^{th}$ byte of the error code block are respectively 0x1E. Values of the $0^{th}$ byte to the $7^{th}$ byte of the idle code block are respectively 0x00. Therefore, the second template bit pattern shown in this application may further include a control byte of the error code block, a control byte of the idle code block, or the like.

In still another possible implementation, the template bit pattern includes a first template bit pattern and a third template bit pattern. The third template bit pattern may be a template bit pattern corresponding to a data code block.

Optionally, the template bit pattern may include a template bit pattern corresponding to a synchronization header and a block type field of an S code block and a synchronization header of the data code block.

Figure 7B:
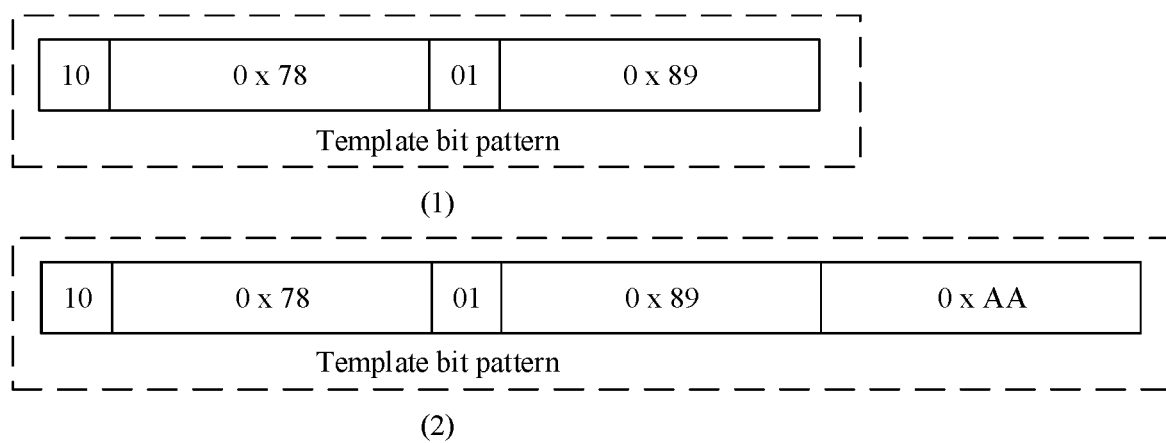

Optionally, as shown in (1) in FIG. 7*b*, the template bit pattern may include a template bit pattern corresponding to the synchronization header and the block type field of the S code block and the synchronization header and the first byte that are of the data code block. It may be understood that 0x89 shown in FIG. 7*b* is a value of the first byte that is used to carry overhead information and that is shown in FIG. 5*b* or FIG. 5*c*. Alternatively, 0x89 may be another value or the like. This is not limited in embodiments of this application. 0xAA shown in FIG. 7*b* may be understood as a value of the second byte used to carry overhead information. Alternatively, 0xAA may be another value or the like. This is not limited in embodiments of this application.

Optionally, as shown in (2) in FIG. 7*b*, the template bit pattern may include a template bit pattern corresponding to the synchronization header and the block type field of the S code block and the first byte, the second byte, and the synchronization header that are of the data code block.

Optionally, the template bit pattern may further include a template bit pattern corresponding to the synchronization header and the block type field of the S code block and the synchronization header of the data code block.

In still another possible implementation, the template bit pattern includes a first template bit pattern, a second template bit pattern, and a third template bit pattern.

It may be understood that for specific descriptions of the first template bit pattern, the second template bit pattern, and the third template bit pattern, refer to the foregoing descriptions. Details are not described herein again.

Figure 7C:
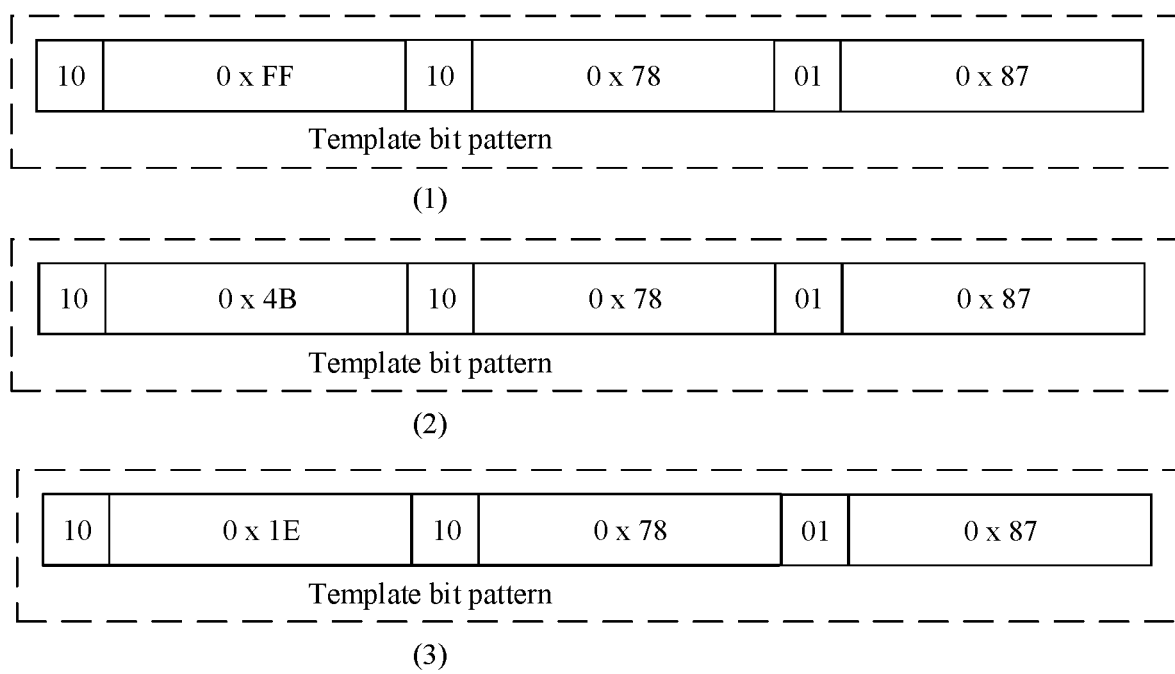

For example, as shown in (1) in FIG. 7*c*, the template bit pattern includes a template bit pattern corresponding to a synchronization header and a block type field of a T code block, a synchronization header and a block type field of an S code block, and a synchronization header of a data code block.

For example, as shown in (2) in FIG. 7*c*, the template bit pattern includes a template bit pattern corresponding to a synchronization header and a block type field of an 0 code block, the synchronization header and the block type field of the S code block, and the synchronization header of the data code block.

For example, as shown in (3) in FIG. 7*c*, the template bit pattern includes a template bit pattern corresponding to a synchronization header and a block type field of an idle code block (or an error code block), the synchronization header and the block type field of the S code block, and the synchronization header of the data code block.

It may be understood that the template bit pattern shown in this application is merely an example. In specific implementations, the template bit pattern may alternatively have more representation forms. This is not limited in this application.

For example, the template bit pattern shown in FIG. 6a is used as an example. The following describes a comparison result (that is, a quantity of inconsistent bits) between the template bit pattern and the to-be-identified bit pattern with reference to FIG. 8a. A $0^{th}$ bit to a $9^{th}$ bit of a first code block are used as an example in embodiments of this application. However, this should not be understood as a limitation on embodiments of this application. For example, when the to-be-identified bit pattern is a template bit pattern corresponding to the $0^{th}$ bit to a $65^{th}$ bit of the first code block, the to-be-identified bit pattern may be compared with the template bit pattern shown in FIG. 6b. Details are not described herein again.

As shown in (1) in FIG. 8a, when the $0^{th}$ bit and the $1^{st}$ bit of the first code block are 10 (that is, a synchronization header of the first code block is 10), and the $2^{nd}$ bit to the $9^{th}$ bit of the first code block are 0x78, through comparison with the template bit pattern, it can be obtained that the quantity of inconsistent bits is 0.

As shown in (2) in FIG. 8a, when the $0^{th}$ bit and the $1^{st}$ bit of the first code block are 10, and the $2^{nd}$ bit to the $9^{th}$ bit of the first code block are 0x79, through comparison with the template bit pattern, it can be obtained that the quantity of inconsistent bits is 1.

As shown in (3) in FIG. 8a, when the $0^{th}$ bit and the $1^{st}$ bit of the first code block are 10, and the $2^{nd}$ bit to the $9^{th}$ bit of the first code block are 0x7A, through comparison with the template bit pattern, it can be obtained that the quantity of inconsistent bits is 1.

For example, when the $0^{th}$ bit and the $1^{st}$ bit of the first code block are 01, and the $2^{nd}$ bit to the $9^{th}$ bit of the first code block are 0x78, through comparison with the template bit pattern, it can be obtained that the quantity of inconsistent bits is 1.

Figure 8B:
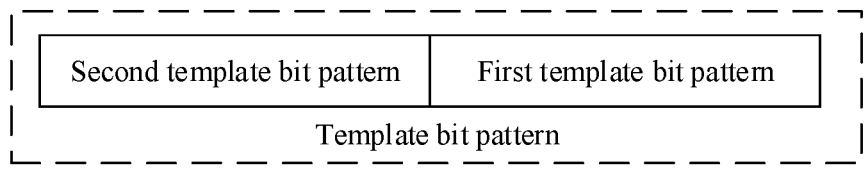
FIG. 8b is a schematic diagram of a structure of a template bit pattern according to an embodiment of this application.
Figure 8B:
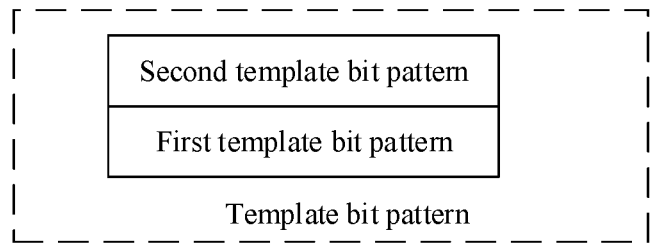
Figure 8C:
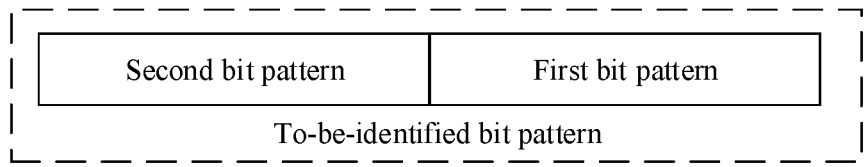
FIG. 8c is a schematic diagram of a structure a to-be-identified bit pattern according to an embodiment of this application.
Figure 8C:
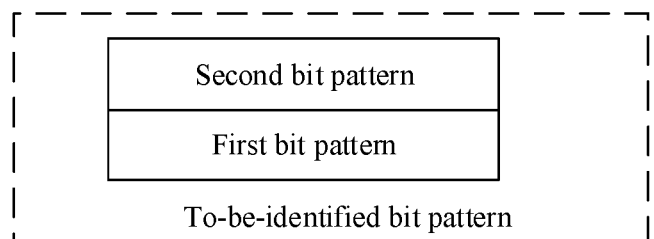

It may be understood that the structure of the template bit pattern shown above is merely an example, and the template bit pattern may alternatively be of another structure or the like. This is not limited in this application. For example, a template bit pattern shown in (1) in FIG. 8b is the structure shown above. In this case, a structure of the to-be-identified bit pattern may be shown in (1) in FIG. 8c. A template bit pattern shown in (2) in FIG. 8b is another structure of the template bit pattern shown in this application. In this case, a structure of the to-be-identified bit pattern may be shown in (2) in FIG. 8c.

It should be noted that, regardless of how the structure of the template bit pattern changes, as long as the first bit pattern in the to-be-identified bit pattern corresponds to the first template bit pattern, the second bit pattern corresponds to the second template bit pattern, and the third bit pattern corresponds to the third template bit pattern, all fall within the protection scope of this application.

It may be understood that the first bit pattern shown in this application corresponds to the first template bit pattern means that the $0^{th}$ bit of the first code block corresponds to a $0^{th}$ bit of the first template bit pattern, the $1^{st}$ bit of the first code block corresponds to a $1^{st}$ bit of the first template bit pattern, the $2^{nd}$ bit of the first code block corresponds to a $2^{nd}$ bit of the first template bit pattern, and by analogy. For example, as shown in (2) in FIG. 8a, the $0^{th}$ bit and the $1^{st}$ bit of the first bit pattern are respectively 10. In this case, 10 may be compared with the $0^{th}$ bit and the $1^{st}$ bit 10 in the first template bit pattern. If the $2^{nd}$ bit to the $9^{th}$ bit of the first bit pattern are 0x79, and a binary value is 0111 1001, the $2^{nd}$ bit to the $9^{th}$ bit, that is, 0111 1001 needs to be compared with 0111 1000 of the $2^{nd}$ bit to a $9^{th}$ bit in the first template bit pattern.

It may be understood that the corresponding description herein is also applicable to the embodiments shown below. For a correspondence between the first bit pattern and the first template bit pattern, a correspondence between the second bit pattern and the second template bit pattern, and a correspondence between the third bit pattern and the third template bit pattern. Details are not described again.

A first path provided in this application (also referred to as a flexible finer-granularity path or a low-order path) may be used for transparently transmit data to an MTN network. In addition, the first path is mapped to the second path (which may also be referred to as a large-granularity path, a higher-order path, an MTN path, or the like) in a slot multiplexing manner. Because the second path is based on an Ethernet physical port, rates of the second path on any two nodes have a rate difference of +/−100 ppm. Therefore, to enable the first path to transparently transmit data to the second path, format encapsulation needs to be performed on the code group shown in this application, so that the first path can reuse the rate adaptation manner of the second path. Based on this, this application provides a code group. The code group may include one S code block, a plurality of D code blocks, and one T code block. It may be understood that for a specific description of the code group, refer to the foregoing description. Details are not described herein again.

In this application, after receiving a code block stream, the communication apparatus needs to restore an fgBU sequence stream from a corresponding second slot. Each fgBU is first identified from the fgBU sequence stream, and then a first slot corresponding to each fgBU is extracted. Therefore, the fgBU can be identified by identifying the S code block. A process of identifying the S code block may also be referred to as fgBU framing. If an exception occurs in the framing process, none of the plurality of first slots corresponding to the fgBU (24 first time slots as shown above) can be extracted, and all fgBUs are discarded and the plurality of D code blocks included in the fgBU are marked as error code blocks. Further, a plurality of slots or a plurality of client signals corresponding to the fgBU cannot be correctly received, resulting in poor system fault tolerance.

In view of this, this application provides a code block identification method and an apparatus, to resolve a case in which the S code block cannot be identified due to occasional bit errors. In addition, a case in which the entire code group is discarded because the S code block cannot be identified due to occasional bit errors is resolved. In addition, according to the method provided in this application, system fault tolerance can be effectively improved.

The code block identification method provided in this application may be applied to a communication apparatus. The communication apparatus may be a wired device, a switch, a router, a network adapter, a packet transport network (PTN), an agile transport network (ATN), a slice packet network (SPN), or the like. A specific form of the communication apparatus is not limited in this application. For example, the communication apparatus may include a receive end configured to receive a code block stream. Alternatively, the communication apparatus may also be understood as a receive end configured to receive a code group, or the like.

Figure 9:
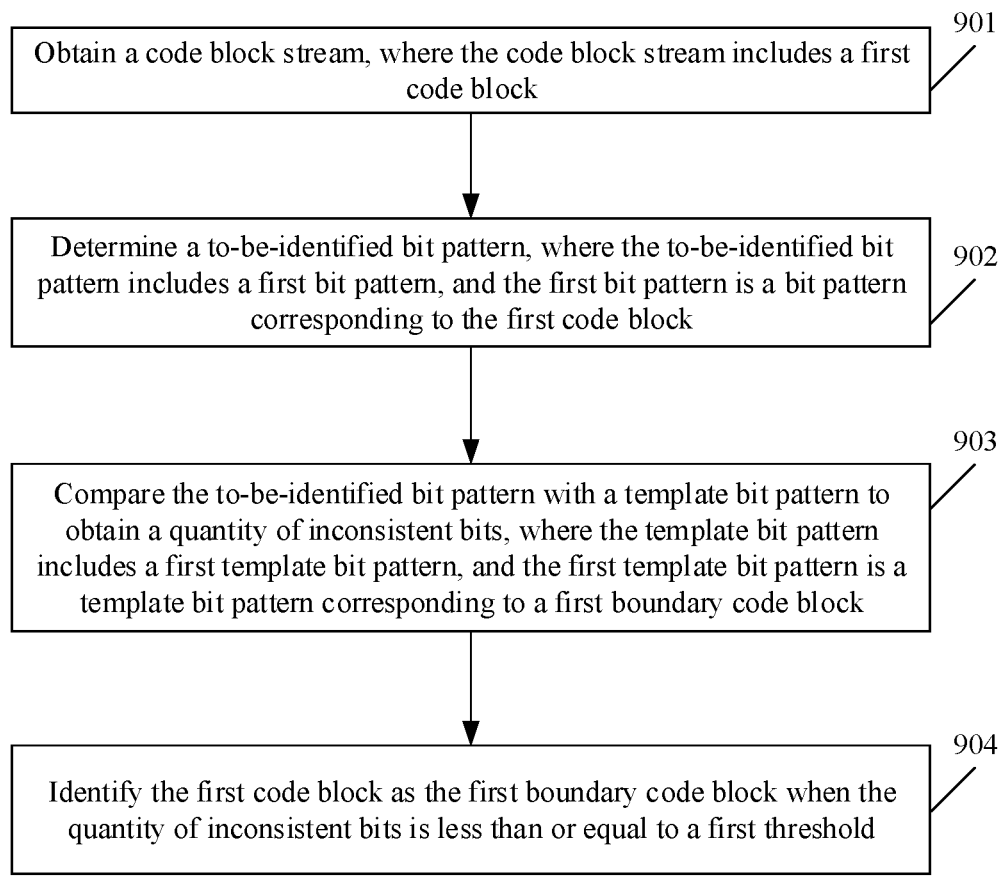
FIG. 9 is a schematic flowchart of a code block identification method according to an embodiment of this application.

FIG. 9 is a schematic flowchart of a code block identification method according to an embodiment of this application. As shown in FIG. 9, the method includes the following steps.

901: Obtain a code block stream, where the code block stream includes a first code block.

For example, a communication apparatus may receive the code block stream, and then obtain the first code block from the code block stream. It may be understood that the communication apparatus obtains the code block stream herein may be understood as: The communication apparatus receives the code block stream from a physical layer, the communication apparatus obtains the code block stream from another apparatus, the communication apparatus obtains the code block stream from an MTN section layer or an MTN path layer, or the like. How the communication apparatus obtains the code block stream is not limited in some embodiments of this application.

902: Determine a to-be-identified bit pattern, where the to-be-identified bit pattern includes a first bit pattern, and the first bit pattern is a bit pattern corresponding to the first code block.

For a specific description of the to-be-identified bit pattern, refer to the foregoing description. Details are not described herein again.

For example, the communication apparatus may obtain the first code block from the received code block stream, and then obtain a $0^{th}$ bit to a $9^{th}$ bit of the first code block from the first code block. The $0^{th}$ bit to the $9^{th}$ bit of the first code block form the to-be-identified bit pattern.

It may be understood that the communication apparatus may receive the code block stream at the MTN section layer, and then determine the to-be-identified bit pattern at the MTN path layer. Alternatively, the communication apparatus may receive the code block stream by using a transceiver, and then determine the to-be-identified bit pattern at the MTN section layer. This is not limited in embodiments of this application.

In a possible implementation, the communication apparatus may determine the to-be-identified bit pattern when receiving the code block stream. For example, when receiving the code block stream at the MTN section layer, the communication apparatus may determine the to-be-identified bit pattern. Then, the communication apparatus may perform the method shown in FIG. 9. After identifying a first boundary code block from the code block stream, the communication apparatus may obtain a code block stream starting with the first boundary code block. For example, after identifying an S code block from the code block stream, the communication apparatus may obtain a plurality of D code blocks after the S code block, then obtain a client signal, and the like.

In another possible implementation, when the communication apparatus needs to demultiplex a first path from a second path at the MTN path layer, the communication apparatus may determine the to-be-identified bit pattern from the code block stream. For example, the communication apparatus may determine the to-be-identified bit pattern at an MTN path adaptation layer. Then, the communication apparatus may perform the method shown in FIG. 9, and after identifying the first boundary code block from the code block stream, the communication apparatus may obtain a code group starting with the first boundary code block. For example, after identifying the S code block from the code block stream, the communication apparatus may obtain a first code group starting with the S code block, and obtain T client signals from the first code group, where T is a positive integer. For example, T=24. In other words, the communication apparatus may obtain, from the first code group, client signals corresponding to a plurality of first slots. One first slot may correspond to one client signal, or the plurality of first slots may correspond to one client signal. It may be understood that for a specific description of the code group, refer to FIG. 5a to FIG. 5d. Details are not described herein again.

In other words, the method shown in FIG. 9 is not only applicable to a scenario in which the communication apparatus needs to demultiplex the first path from the second path, that is, a scenario in which the communication apparatus needs to identify each fgBU from an fgBU sequence stream. In addition, the method is further applicable to a scenario in which the S code block is identified from a 64B/66B code block stream, and the like. A scenario to which the method provided in some embodiments of this application is applicable is not limited.

903: Compare the to-be-identified bit pattern with a template bit pattern to obtain a quantity of inconsistent bits, where the template bit pattern includes a first template bit pattern, and the first template bit pattern is a template bit pattern corresponding to the first boundary code block.

In some embodiments of this application, the first template bit pattern corresponds to the first bit pattern, that is, a position of the first template bit pattern in the template bit pattern corresponds to a position of the first bit pattern in the to-be-identified bit pattern. In other words, the first template bit pattern may be used to identify the first bit pattern.

For the template bit pattern and a correspondence between the to-be-identified bit pattern and the template bit pattern, refer to the foregoing description. Details are not described herein again. As shown above, the template bit pattern may include the first template bit pattern, and may further include a second template bit pattern and/or a third template bit pattern. For example, for the template bit pattern, refer to FIG. 6a, FIG. 6b, FIG. 7a to FIG. 7c, and the like. For the correspondence between the to-be-identified bit pattern and the template bit pattern, refer to FIG. 8a, FIG. 8b, and the like.

For example, the code block stream further includes a second code block, the to-be-identified bit pattern further includes a second bit pattern, and the second bit pattern is a bit pattern corresponding to the second code block. For a description of the second bit pattern, refer to the foregoing description of the first bit pattern. Details are not described herein again. Therefore, the second template bit pattern corresponds to the second bit pattern, that is, the second template bit pattern may be used to identify the second bit pattern.

For example, the code block stream further includes a third code block, the to-be-identified bit pattern further includes a third bit pattern, and the third bit pattern is a bit pattern corresponding to the third code block. For a description of the third bit pattern, refer to the foregoing description of the first bit pattern. Details are not described herein again. Therefore, the third template bit pattern corresponds to the third bit pattern, that is, the third template bit pattern may be used to identify the third bit pattern.

904: Identify the first code block as the first boundary code block when the quantity of inconsistent bits is less than or equal to a first threshold.

In some embodiments of this application, the first threshold may be 1, that is, when the quantity of inconsistent bits is less than or equal to 1, the communication apparatus may identify (or determine) that the first code block is the first boundary code block (for example, the S code block).

Alternatively, the first threshold may be 2, that is, when the quantity of inconsistent bits is less than or equal to 2, the communication apparatus may determine that the first code block is the first boundary code block. Alternatively, the first threshold may be another value, or the like. This is not limited in embodiments of this application.

Optionally, the step 904 may include: when the quantity of inconsistent bits between the to-be-identified bit pattern and the template bit pattern is greater than or equal to 1, and the quantity of inconsistent bits is less than or equal to the first threshold, identifying the first code block as the first boundary code block.

In other words, in the method provided in some embodiments of this application, when there may be inconsistent bits between the to-be-identified bit pattern and the template bit pattern, and the quantity of inconsistent bits is less than or equal to the first threshold, the communication apparatus may still identify the first code block as the first boundary code block. For specific descriptions of the first template bit pattern, the second template bit pattern, and the third template bit pattern, refer to the foregoing descriptions. Details are not described herein again.

Optionally, the step 904 may include: when the first template bit pattern is inconsistent with the first bit pattern, and the quantity of inconsistent bits between the to-be-identified bit pattern and the template bit pattern is less than or equal to the first threshold, identifying the first code block as the first boundary code block. The inconsistency between the first template bit pattern and the first bit pattern means that values of the first template bit pattern and values of the first bit pattern at corresponding positions are not completely consistent. In other words, even if the first template bit pattern is not completely consistent with the first bit pattern, it may be determined that the first code block is the S code block. This is because, on the one hand, 2-bit Hamming distance protection is used on a synchronization header of each code block, and a probability that an error occurs in each of two consecutive bits, for example, 01 jumping to 10, is low. On the other hand, 4-bit Hamming distance protection is used between control block type fields. An error of one or two of eight bits in the control block type field does not cause the S code block to be mistakenly identified as another control code block, for example, an O code block or a T code block. Therefore, in some embodiments of this application, even if the values of the first bit pattern and the values of the first template bit pattern at the corresponding positions are not completely consistent, the first code block may be identified as the S code block. It may be understood that the description of Hamming distance protection for the synchronization header and the control block type field is applicable to the first code block, the second code block, the third code block, or the like shown in this application.

Optionally, the step 904 may further include: when the first template bit pattern is consistent with the first bit pattern, and the quantity of inconsistent bits between the to-be-identified bit pattern and the template bit pattern is less than or equal to the first threshold, identifying the first code block as the first boundary code block. In other words, when the first template bit pattern is consistent with the first bit pattern, but the second bit pattern is inconsistent with the second template bit pattern and a quantity of inconsistent bits is less than or equal to the first threshold, the communication apparatus may still identify the first code block as the first boundary code block. For example, if a synchronization header of the second code block is 0b10, 0b00, or 0b11, it indicates that an occasional bit error may exist in the synchronization header of the second code block. Therefore, the first code block may still be identified as the first boundary code block.

Optionally, the step 904 may further include: determining the second bit pattern; comparing the second bit pattern with the second template bit pattern; and when the quantity of inconsistent bits between the to-be-identified bit pattern and the template bit pattern is less than or equal to the first threshold, and a quantity of inconsistent bits between the second bit pattern and the second template bit pattern is less than or equal to a second threshold, identifying the first code block as the first boundary code block.

In some embodiments of this application, the second threshold may be less than or equal to the first threshold. For example, the second threshold may be 1, or the like. This is not limited in embodiments of this application. In some embodiments of this application, the communication apparatus may further compare the second bit pattern and the second template bit pattern, so that when the quantity of inconsistent bits between the to-be-identified bit pattern and the template bit pattern is less than or equal to the first threshold, and when the quantity of inconsistent bits between the second bit pattern and the second template bit pattern is less than or equal to the second threshold, the communication apparatus identifies the first code block as the first boundary code block.

In other words, the communication apparatus may compare the to-be-identified bit pattern (for example, the first bit pattern) with the template bit pattern (for example, the first template bit pattern), and compare the second bit pattern with the second template bit pattern. Therefore, when the quantity of inconsistent bits between the to-be-identified bit pattern and the template bit pattern is less than or equal to the first threshold, and when the quantity of inconsistent bits between the second bit pattern and the second template bit pattern is less than or equal to the second threshold, the first code block is identified as the first boundary code block. It should be noted that the quantity of inconsistent bits between the second bit pattern and the second template bit pattern is not included in the first threshold.

Optionally, the step 904 may further include: determining the second bit pattern; comparing the second bit pattern with the second template bit pattern; and when the quantity of inconsistent bits between the to-be-identified bit pattern and the template bit pattern is less than or equal to the first threshold, and when the second bit pattern is consistent with the second template bit pattern, identifying the first code block as the first boundary code block.

It may be understood that for descriptions of the second bit pattern and the second template bit pattern, refer to other embodiments of this application. Details are not described herein again.

According to the method provided in some embodiments of this application, when a quantity of inconsistent bits between the first code block and the first boundary code block (for example, the S code block) is not 0, a case in which it is determined that the first code block is not the first boundary code block can be effectively resolved. Therefore, a case in which the first code block cannot be identified as the first boundary code block due to an occasional bit error is resolved, thereby improving system fault tolerance. For example, the foregoing case is resolved, so that a case in which the entire code group is discarded because the S code block cannot be identified is effectively resolved. The S code block is identified, so that the communication apparatus can demultiplex a plurality of first slots corresponding to a code group starting with the S code block, to obtain client signals corresponding to the plurality of first slots. This is not only simply in implementation, but also can ensure reliability of identifying the code group.

With reference to the methods shown above, the code block identification method provided in embodiments of this application is described in detail below by using a transmit end and a receive end as an example.

Figure 10A:
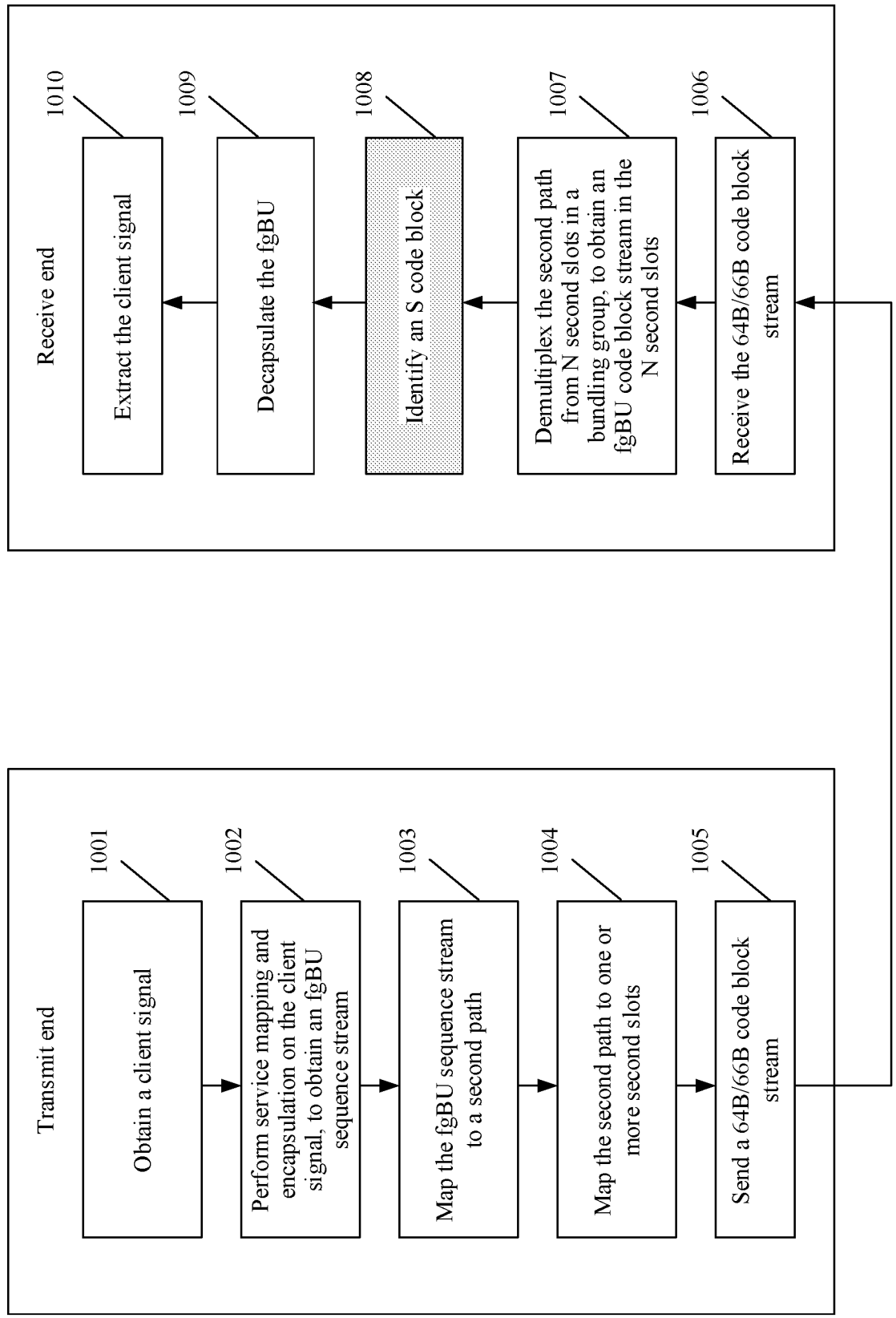
FIG. 10a is a schematic flowchart of a code block identification method according to an embodiment of this application.

FIG. 10a is a schematic flowchart of a code block identification method according to an embodiment of this application. As shown in FIG. 10a, the method includes the following steps.

1001: A transmit end obtains a client signal (client).

Step 1001 may include: the transmit end receives the client signal from a panel-side interface, the transmit end generates the client signal, or the like. It may be understood that the panel-side interface shown herein may be understood as a user-side interface (UNI) or the like.

1002: The transmit end performs service mapping and encapsulation on the client signal to obtain an fgBU sequence stream.

FIG. 3 is used as an example. After obtaining the client signal, the transmit end may form an fgBU of a preset length by using an MTN fg adaptation layer. Then, the transmit end may map the fgBU to a first path at an MTN fg trail termination layer.

1003: The transmit end maps the fgBU sequence stream to a second path.

The fgBU sequence stream shown herein means that before the fgBU sequence stream is mapped to the second path, the transmit end transmits the fgBU. For example, the transmit end may map the fgBU sequence stream to the second path at an MTN path layer. With reference to FIG. 3, the transmit end may multiplex, at an MTN path adaptation layer, one or more first slots obtained through division by the second path, that is, the first path may include one or more first slots. For example, the following describes the method shown in FIG. 10a by using an example in which the first path includes M first slots.

1004: The transmit end maps the second path to one or more second slots.

For example, the transmit end may map the second path to the one or more second slots at an MTN section layer. FIG. 3 is used as an example. The transmit end may map the second path to the one or more second slots at an MTN section adaptation layer, to multiplex a bundling group. For example, at the MTN section adaptation layer, the transmit end needs to interleave each MAC service flow, (that is, a form of a 64B/66B code block) to form one 64B/66B code block stream. In this case, the transmit end may map each code block in the second path to the one or more second slots.

For example, the following describes the method shown in FIG. 10a by using an example in which the second path includes N second slots.

1005: The transmit end sends the 64B/66B code block stream.

For example, the 64B/66B code block stream may enter a physical layer for transmission through the MTN section trail termination layer, the adaptation layer, or the like.

1006: The receive end receives the 64B/66B code block stream.

For example, the receive end may obtain the 64B/66B code block stream from the physical layer.

1007: The receive end demultiplexes the second path from the N second slots in the bundling group, to obtain an fgBU code block stream in the N second slots.

It may be understood that the fgBU code block stream received by the receive end is still in a form of the 64B/66B code block.

1008: The receive end identifies an S code block.

For a method for identifying the S code block by the receive end, refer to FIG. 9, a method embodiment shown below, and the like. Details are not described herein again.

1009: The receive end decapsulates the fgBU.

After identifying the S code block from the code block stream, the receive end may identify, based on the S code block, an fgBU starting with the S code block. For example, the receive end may obtain 195 data code blocks and one T code block in the fgBU. For example, after identifying the S code block, the receive end may demultiplex the first path from the M first slots in the second path at the MTN path layer, to obtain the fgBU starting with the S code block.

It may be understood that the receive end herein demultiplexes the first path from the M first slots of the second path may also be understood as: the receive end restores the first path from the M first slots of the second path, to obtain the fgBU in the first path.

1010: The receive end extracts the client signal.

For example, after demultiplexing the first path from the M first slots on the second path, the receive end may obtain a client signal corresponding to each of the M first slots.

It may be understood that after extracting the client signal, the receive end may further perform a forwarding operation, termination operation, or the like on the service flow. This is not limited in embodiments of this application.

That the receive end identifies the S code block in step 1008 may be understood as being executed by a processor of the receive end, may be understood as being implemented in the MTN path adaptation layer in an MTN network of the receive end (only an example), or may be understood as being performed by a function, a module, a unit, or the like in the receiver. This is not limited in embodiments of this application.

Figure 10B:
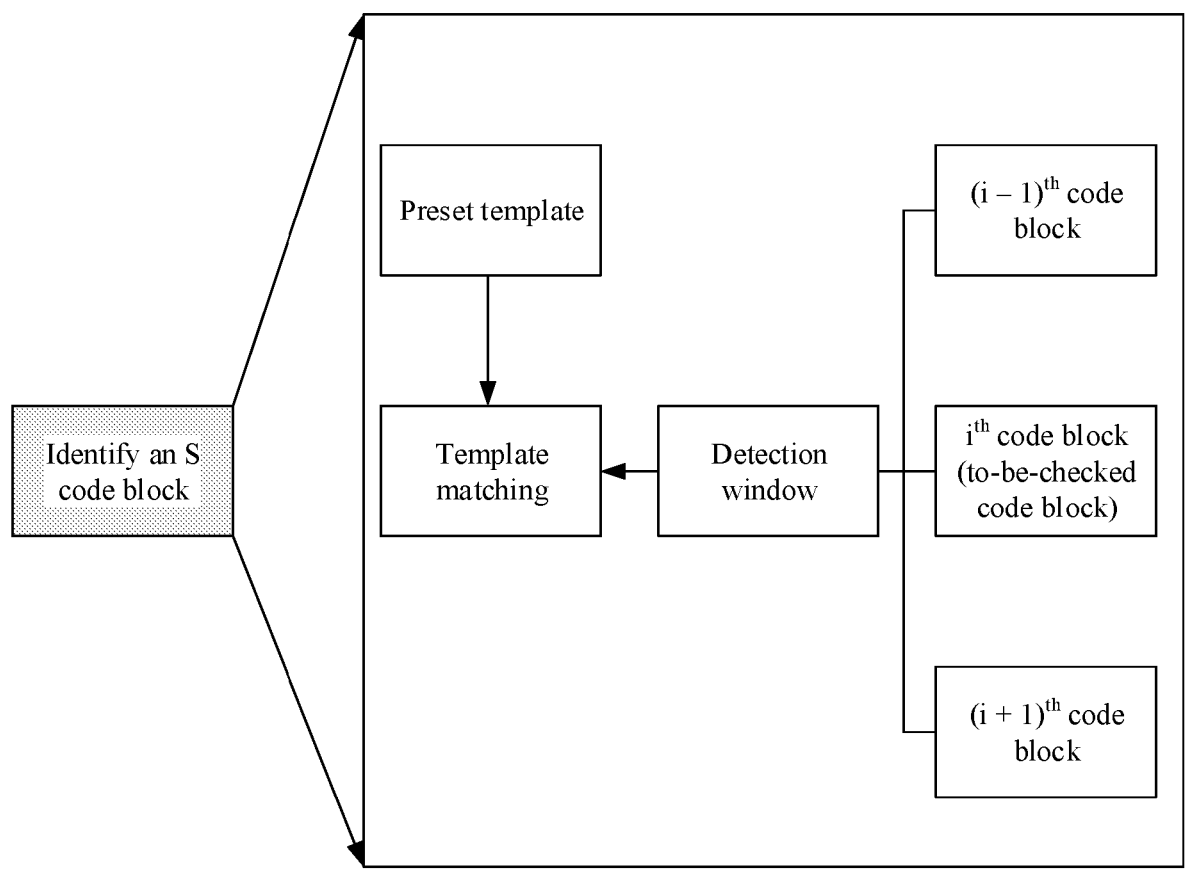
FIG. 10b is a schematic diagram of a module for identifying a start (S) code block according to an embodiment of this application.

For example, as shown in FIG. 10b, a function module used by the receive end to identify the S code block may include a template matching module, a template storage module, and a detection window module. The template storage module stores a template required for identifying the first code block as the S code block. In other words, the template storage module is configured to store the template bit pattern shown in some embodiments of this application. The detection window module may be configured to extract corresponding bits from a first code block, a second code block, or a third code block, to form a to-be-identified bit pattern. The template matching module is configured to compare a bit pattern (that is, the to-be-identified bit pattern) in a detection window with the template bit pattern.

Therefore, the receive end may identify a first code block that meets an expectation of a comparison result as the S code block. When the S code block is determined, the receive end completes fgBU framing. Therefore, the slot data encapsulated in the fgBU is obtained based on a start position of the fgBU.

It may be understood that the modules shown in FIG. 10b are merely examples, and this is not limited in embodiments of this application.

To understand the foregoing method in more detail, the following provides a specific embodiment of the code block identification method. It may be understood that an execution subject in the following embodiments may be understood as the receive end of the 64B/66B code block stream.

In some embodiments of this application, the second code block and the third code block may separately be code blocks adjacent to the first code block. Therefore, for ease of description, the following uses an example in which the first code block is an $i^{th}$ code block, the second code block is an $(i-1)^{th}$ code block, and the third code block is an $(i+1)^{th}$ code block to describe the code block identification method provided in some embodiments of this application.

Implementation 1

Figure 11:
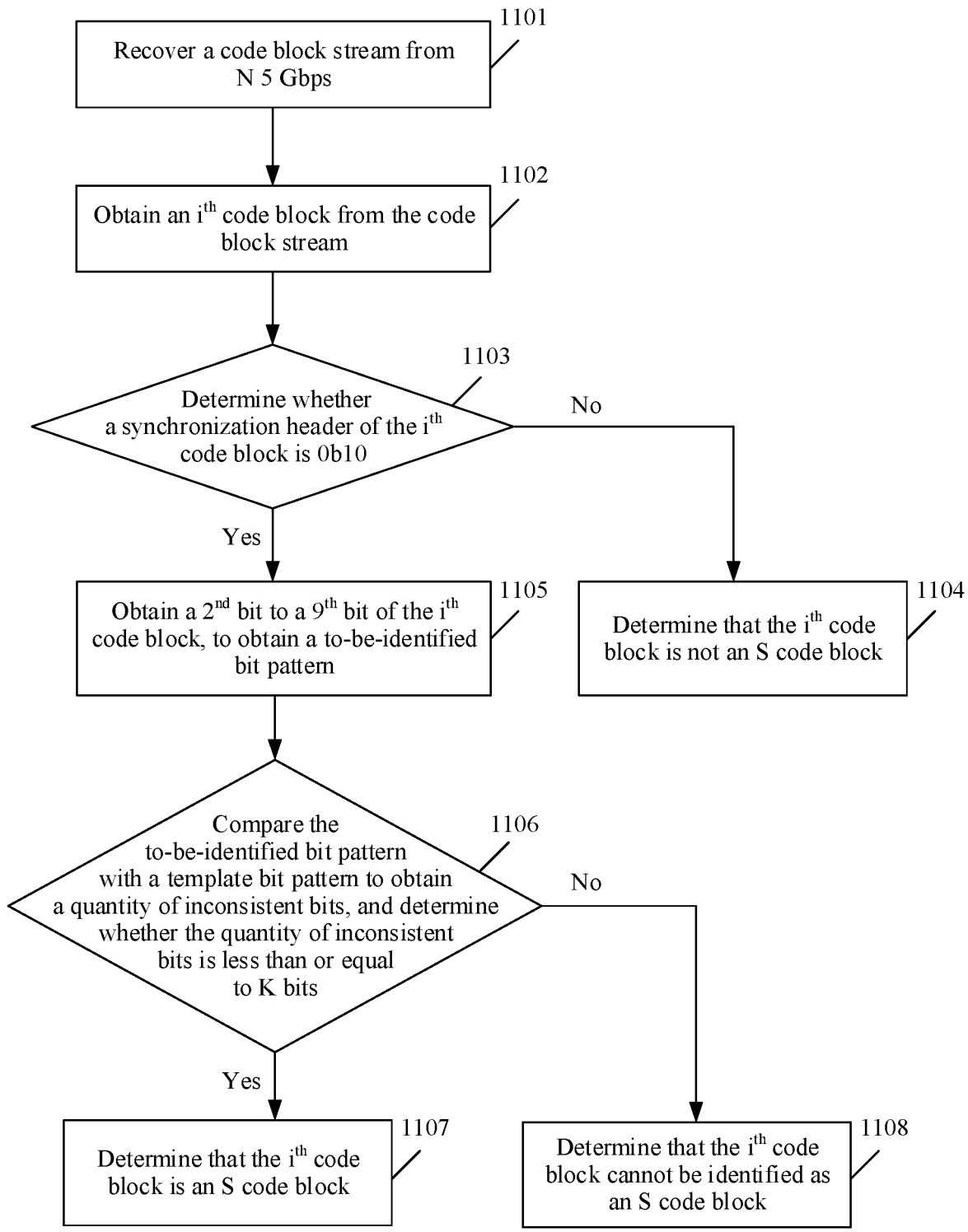
FIG. 11 is a schematic flowchart of a code block identification method according to an embodiment of this application.

FIG. 11 is a schematic flowchart of a code block identification method according to an embodiment of this application. As shown in FIG. 11, the method includes the following steps.

1101: A receive end restores a code block stream from N 5 Gbps.

It may be understood that for how the receive end restores the code block stream from the N 5 Gbps, refer to the foregoing description. Details are not described herein again.

1102: The receive end obtains an $i^{th}$ code block from the code block stream.

In a possible implementation, the receive end may obtain one code block (that is, the $i^{th}$ code block) from the code block stream at a fixed period.

In another possible implementation, the receive end may obtain the $i^{th}$ code block from the code block stream based on a preset length of a code group. For example, when the code group includes 197 code blocks, the receive end may obtain one code block (that is, the $i^{th}$ code block) every 197 code blocks based on the length of the code group.

In still another possible implementation, the receive end may alternatively obtain the $i^{th}$ code block from the code block stream based on a synchronization header and the like of a known code block. For example, if the receive end has learned that a synchronization header of a specific code block is 0b10, the code block may be the $i^{th}$ code block. A previous code block, a next code block, or the like of the specific code block may also be the $i^{th}$ code block, or the like.

It may be understood that the receive end obtains the $i^{th}$ code block from the code block stream may also be understood as: the receive end identifies the $i^{th}$ code block, the receive end searches the code block stream for the $i^{th}$ code block, or the like.

It may be understood that a manner in which the receive end obtains the $i^{th}$ code block is not limited in some embodiments of this application.

1103: The receive end determines whether a synchronization header of the $i^{th}$ code block is 0b10. If yes, step 1105 is performed; otherwise, step 1104 is performed.

1104: The receive end determines that the $i^{th}$ code block is not an S code block, that is, the $i^{th}$ code block cannot be identified as an S code block.

It may be understood that when the $i^{th}$ code block cannot be identified as the S code block, the receive end may stop searching for the code block. Alternatively, the receive end may start to search for a next code block, or the like. This is not limited in embodiments of this application.

1105: The receive end obtains a $2^{nd}$ bit to a $9^{th}$ bit of the $i^{th}$ code block, to obtain a to-be-identified bit pattern.

With reference to the schematic diagram of the module for identifying the S code block shown in FIG. 10b, the receive end may obtain the $2^{nd}$ bit to the $9^{th}$ bit of the $i^{th}$ code block by using a detection window module.

1106: The receive end compares the to-be-identified bit pattern with a template bit pattern to obtain a quantity of inconsistent bits. Then, the receive end determines whether the quantity of inconsistent bits is less than or equal to K bits. If yes, step 1107 is performed; otherwise, step 1108 is performed.

It may be understood that the receive end may compare the to-be-identified bit pattern with the template bit pattern at corresponding positions. The template bit pattern may be a bit pattern of the S code block. For example, the template bit pattern may be a template bit pattern corresponding to the $2^{nd}$ bit to the $9^{th}$ bit of the S code block. For another example, the template bit pattern may alternatively be a template bit pattern corresponding to the $0^{th}$ bit to the $65^{th}$ bit of the S code block. However, during comparison, because the receive end obtains the $2^{nd}$ bit to the $9^{th}$ bit of the $i^{th}$ code block, the receive end needs to sequentially compare the $2^{nd}$ bit to the $9^{th}$ bit of the $i^{th}$ code block with the $2^{nd}$ bit to the $9^{th}$ bit of the S code block respectively. It may be understood that the description of the template bit pattern is also applicable to embodiments shown below.

In some embodiments of this application, the receive end may further obtain more bits of the $i^{th}$ code block, for example, obtain the $2^{nd}$ bit to the $65^{th}$ bit of the $i^{th}$ code block, or obtain the $2^{nd}$ bit to the $17^{th}$ bit of the $i^{th}$ code block.

Optionally, the receive end may not perform the foregoing step 1103, but directly obtain a $0^{th}$ bit to the $9^{th}$ bit of the $i^{th}$ code block. This is not limited in embodiments of this application.

1107: If the quantity of inconsistent bits is less than or equal to the K bits (for example, K=2), the receive end determines that the $i^{th}$ code block is the S code block.

1108: If the quantity of inconsistent bits is greater than the K bits, the receive end determines that the $i^{th}$ code block cannot be identified as the S code block.

It may be understood that for a specific implementation in which the receive end identifies the S code block and demultiplexes a first path from a second path, refer to the foregoing description. Details are not described herein again.

In some embodiments of this application, the receive end obtains the $i^{th}$ code block, and identifies whether the $i^{th}$ code block is the S code block. Therefore, even if a bit pattern of the $i^{th}$ code block is not completely consistent with a bit pattern of the S code block, as long as the quantity of inconsistent bits between the to-be-identified bit pattern and the template bit pattern at the corresponding position is less than or equal to the K bits, the $i^{th}$ code block may still be identified as the S code block. This method is not only convenience and simply in implementation, but also effectively improves system fault tolerance.

Implementation 2

Figure 12A:
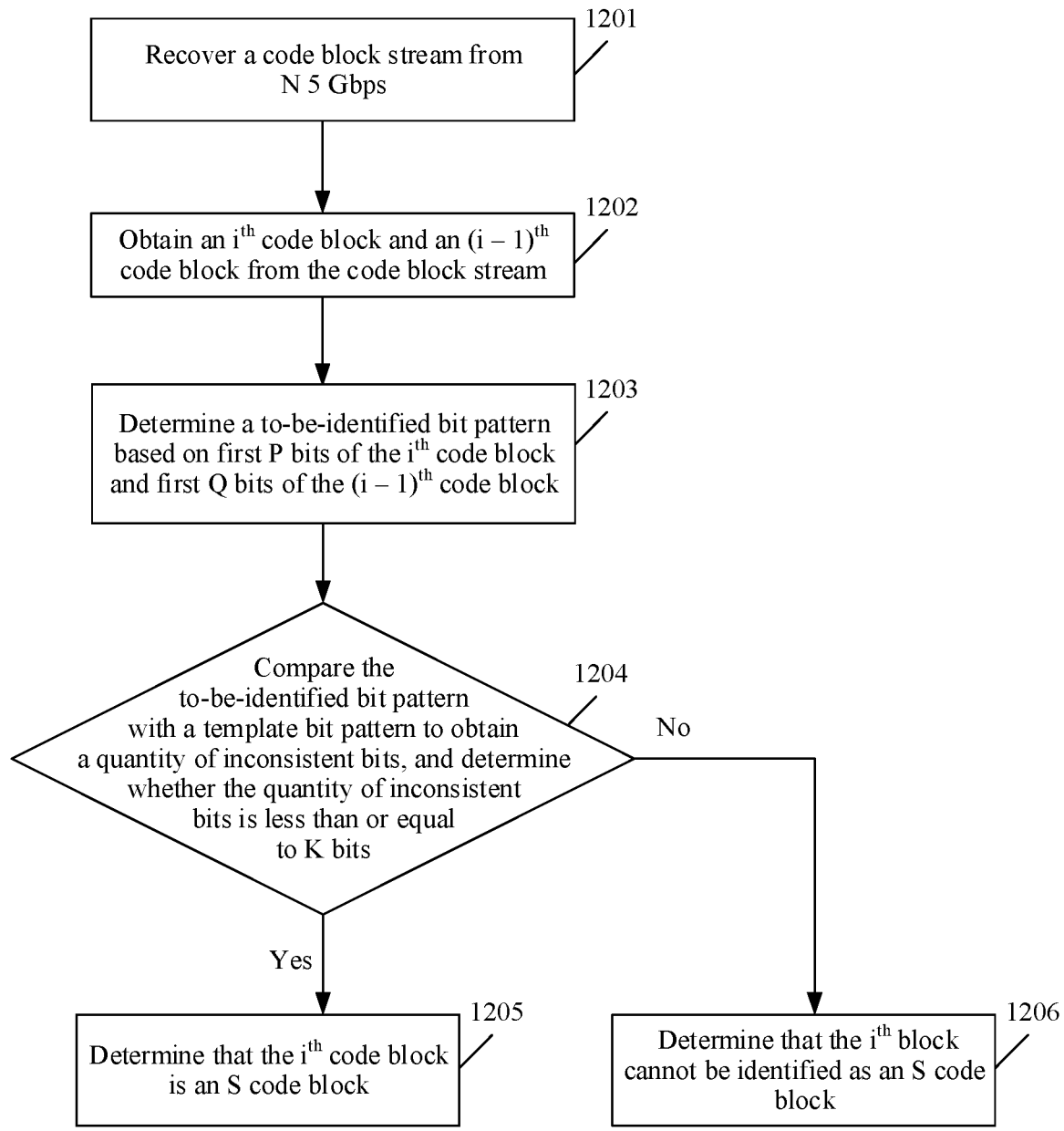
FIG. 12a and FIG. 12b are schematic flowcharts of another code block identification method according to an embodiment of this application.

FIG. 12a is a schematic flowchart of a code block identification method according to an embodiment of this application. As shown in FIG. 12a, the code block identification method includes the following steps.

1201: A receive end restores a code block stream from N 5 Gbps.

1202: The receive end obtains the $i^{th}$ code block and the $(i-1)^{th}$ code block from the code block stream.

In a possible implementation, the receive end may obtain two adjacent code blocks from the code block stream, and the two adjacent code blocks are respectively the $(i-1)^{th}$ code block and the $i^{th}$ code block.

In another possible implementation, the receive end may obtain one code block, that is, the $i^{th}$ code block, from the code block stream. Then, the receive end obtains a previous code block of the $i^{th}$ code block, that is, the $(i-1)^{th}$ code block.

In still another possible implementation, the receive end may alternatively obtain the $i^{th}$ code block and the $(i-1)^{th}$ code block based on a code block that has been identified not as an S code block. For this implementation, refer to the method shown in FIG. 12b. For example, for this implementation, refer to step 1213 in FIG. 12b and the like.

1203: The receive end determines a to-be-identified bit pattern based on first P bits of the $i^{th}$ code block and first Q bits of the $(i-1)^{th}$ code block.

For example, after obtaining the $i^{th}$ code block and the $(i-1)^{th}$ code block, the receive end may obtain the first P bits of the $i^{th}$ code block and the first Q bits of the $(i-1)^{th}$ code block. Alternatively, the receive end may have identified the $(i-1)^{th}$ code block. In this case, the receive end has obtained a bit pattern of the $(i-1)^{th}$ code block. Therefore, the receive end may obtain the first P bits of the $i^{th}$ code block. Therefore, the to-be-identified bit pattern is formed based on the first P bits of the $i^{th}$ code block and the first Q bits of the $(i-1)^{th}$ code block. P is an integer greater than or equal to 2, and Q is an integer greater than or equal to 2.

For example, when P=Q=10, the $0^{th}$ bit to the $9^{th}$ bit in the to-be-identified bit pattern may be sequentially first 10 bits of the $(i-1)^{th}$ code block. A $10^{th}$ bit to a $19^{th}$ bit in the to-be-identified bit pattern may be sequentially first 10 bits of the $i^{th}$ code block.

1204: The receive end compares the to-be-identified bit pattern with a template bit pattern to obtain a quantity of inconsistent bits. Then, the receive end determines whether the quantity of inconsistent bits is less than or equal to K bits. If yes, step 1205 is performed; otherwise, step 1206 is performed.

For example, the template bit pattern may be shown in FIG. 7a.

1205: If the quantity of inconsistent bits is less than or equal to the K bits (for example, K=2), the receive end determines that the $i^{th}$ code block is the S code block.

1206: If the quantity of inconsistent bits is greater than the K bits, the receive end determines that the $i^{th}$ code block cannot be identified as the S code block.

The method provided in some embodiments of this application can improve system fault tolerance.

Implementation 3

1211: A receive end restores a code block stream from N 5 Gbps.

1212: The receive end obtains an $i^{th}$ code block from the code block stream.

1213: The receive end determines whether a synchronization header of the $i^{th}$ code block is 0b10. If yes, step 1215 is performed; otherwise, step 1214 is performed.

1214: The receive end determines that the $i^{th}$ code block is not an S code block, that is, the $i^{th}$ code block cannot be identified as the S code block.

When identifying that the $i^{th}$ code block is not the S code block, the receive end may further store at least two bits of the $i^{th}$ code block. For example, the receive end may store the synchronization header of the $i^{th}$ code block. Alternatively, the receive end may further store the 0th bit to the $9^{th}$ bit of the $i^{th}$ code block. Alternatively, the receive end may further store the $0^{th}$ bit to the $66^{th}$ bit of the $i^{th}$ code block, and the like. In one aspect, the at least two bits of the $i^{th}$ code block are stored, so that when subsequently needing to use the at least two bits of the $i^{th}$ code block, the receive end can directly obtain the stored at least two bits of the $i^{th}$ code block. On the other hand, the at least two bits of the $i^{th}$ code block are stored, so that useful information may be further provided for the receive end to subsequently identify an (i+1)th code block and the like. It may be understood that the description of storing the $i^{th}$ code block is also applicable to another embodiment shown in this application.

1215: The receive end obtains a $2^{nd}$ bit to the $9^{th}$ bit of the $i^{th}$ code block, to obtain a to-be-identified bit pattern.

1216: The receive end compares the to-be-identified bit pattern with a template bit pattern to obtain a quantity of inconsistent bits. Then, the receive end determines whether the quantity of inconsistent bits is less than or equal to K bits. If yes, step 1217 is performed; otherwise, step 1218 is performed.

For example, the template bit pattern may be shown in FIG. 6a or FIG. 6b.

1217: The receive end obtains the $0^{th}$ bit and the $1^{st}$ bit of the $(i-1)^{th}$ code block.

For example, the receive end may further obtain the $0^{th}$ bit to a $9^{th}$ bit of the $(i-1)^{th}$ code block. This is not limited in embodiments of this application.

1218: The receive end determines that the $i^{th}$ code block is not the S code block.

1219: Determine, based on the $0^{th}$ bit and the $1^{st}$ bit of the $(i-1)^{th}$ code block, whether a synchronization header of the $(i-1)^{th}$ code block is 0b01. If no, step 1220 is performed. If yes, step 1221 is performed.

It may be understood that in some embodiments of this application, when the synchronization header of the $(i-1)^{th}$ code block is 0b01, it indicates that the $(i-1)^{th}$ code block is a data code block, and the first code block cannot be the S code block. However, when the $(i-1)^{th}$ code block is not the data code block, for example, the $(i-1)^{th}$ code block is an error code block, a T code block, an O code block, or the like, it indicates that the $i^{th}$ code block may be the S code block.

It may be understood that a sequence of step 1217, step 1216, step 1215, or the like is not limited in some embodiments of this application. For example, the receive end may further simultaneously perform step 1215, step 1217, and the like. This is not limited in embodiments of this application.

1220: The receive end determines that the $i^{th}$ code block is the S code block.

1221: The receive end determines that the $i^{th}$ code block is not the S code block.

It may be understood that, in this case, the receive end may further store the $2^{nd}$ bit to the $9^{th}$ bit of the $(i-1)^{th}$ code block, the $2^{nd}$ bit to the $9^{th}$ bit of the $i^{th}$ code block, or the like.

In some embodiments of this application, the receive end can determine, by comparing a bit pattern of the $i^{th}$ code block with the template bit pattern, whether the $i^{th}$ code block can be identified as the S code block. Further, whether the $(i-1)^{th}$ code block is a control code block is determined, so that accuracy and reliability of identifying whether the $i^{th}$ code block is the S code block can be further improved, and system fault tolerance can be ensured.

It may be understood that the method shown in embodiments of this application is also applicable to embodiments of the $i^{th}$ code block and the (i+1)th code block. To avoid repetition, details are not described in the following.

Implementation 4

Figure 13:
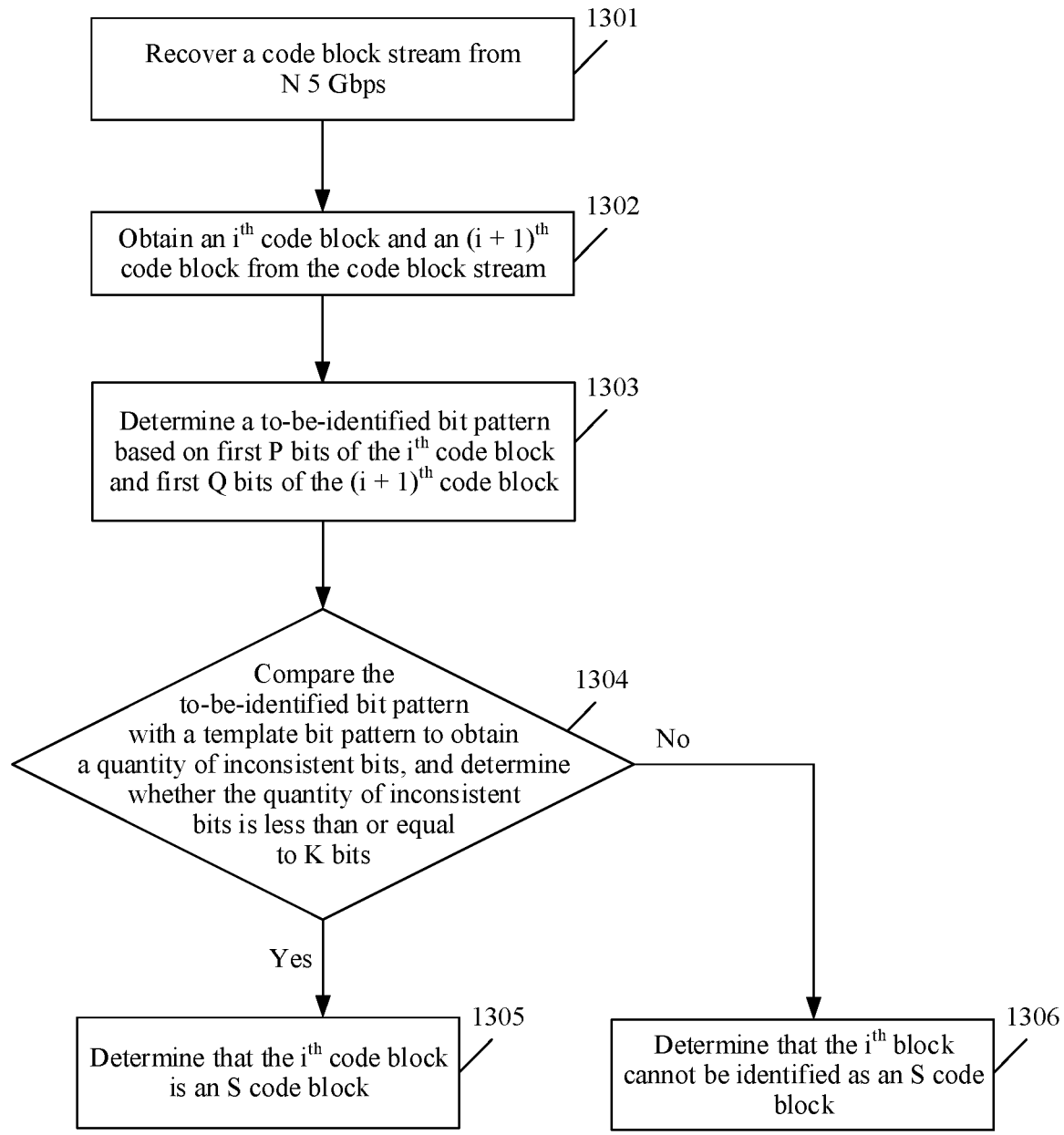
FIG. 13 and FIG. 14 are schematic flowcharts of still another code block identification method according to an embodiment of this application.

FIG. 13 is a schematic flowchart of a code block identification method according to an embodiment of this application. As shown in FIG. 13, the method includes the following steps.

1301: A receive end restores a code block stream from N 5 Gbps.

1302: The receive end obtains the $i^{th}$ code block and the (i+1)th code block from the code block stream.

It may be understood that for a specific description of obtaining, by the receive end, the $i^{th}$ code block and the (i+1)th code block, refer to the description of step 1202 shown above. Details are not described herein again.

1303: The receive end determines a to-be-identified bit pattern based on first P bits of the $i^{th}$ code block and first Q bits of the (i+1)th code block.

1304: The receive end compares the to-be-identified bit pattern with a template bit pattern to obtain a quantity of inconsistent bits. Then, the receive end determines whether the quantity of inconsistent bits is less than or equal to K bits. If yes, step 1305 is performed; otherwise, step 1306 is performed.

For example, the template bit pattern may be shown in FIG. 7b.

1305: If the quantity of inconsistent bits is less than or equal to the K bits (for example, K=2), the receive end determines that the $i^{th}$ code block is an S code block.

1306: If the quantity of inconsistent bits is greater than the K bits, the receive end determines that the $i^{th}$ code block is not an S code block.

Figure 12B:
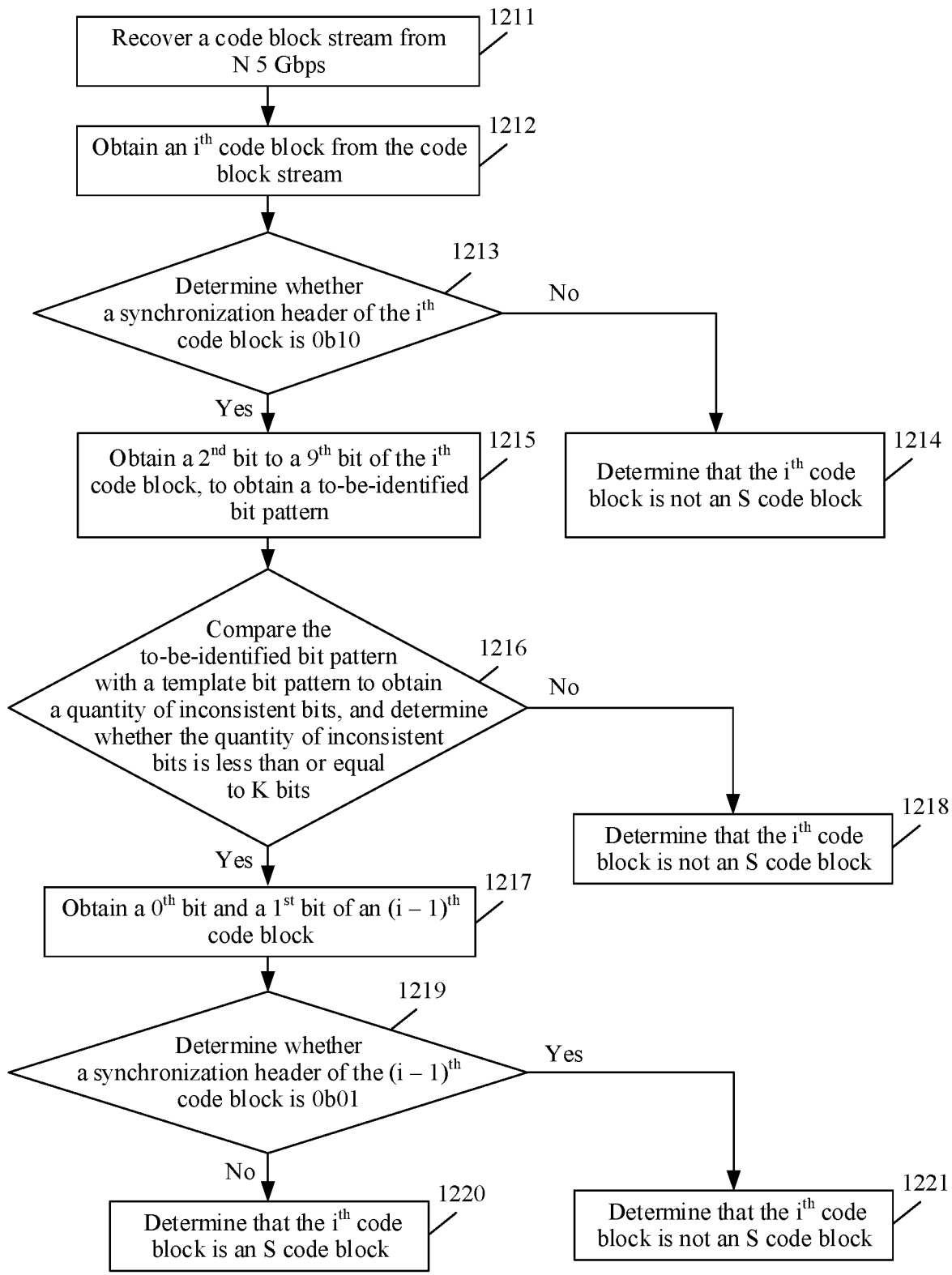

It may be understood that for a specific description of FIG. 13, refer to the description in FIG. 11, FIG. 12a, FIG. 12b, or the like. Details are not described herein again.

Implementation 5

Figure 14:
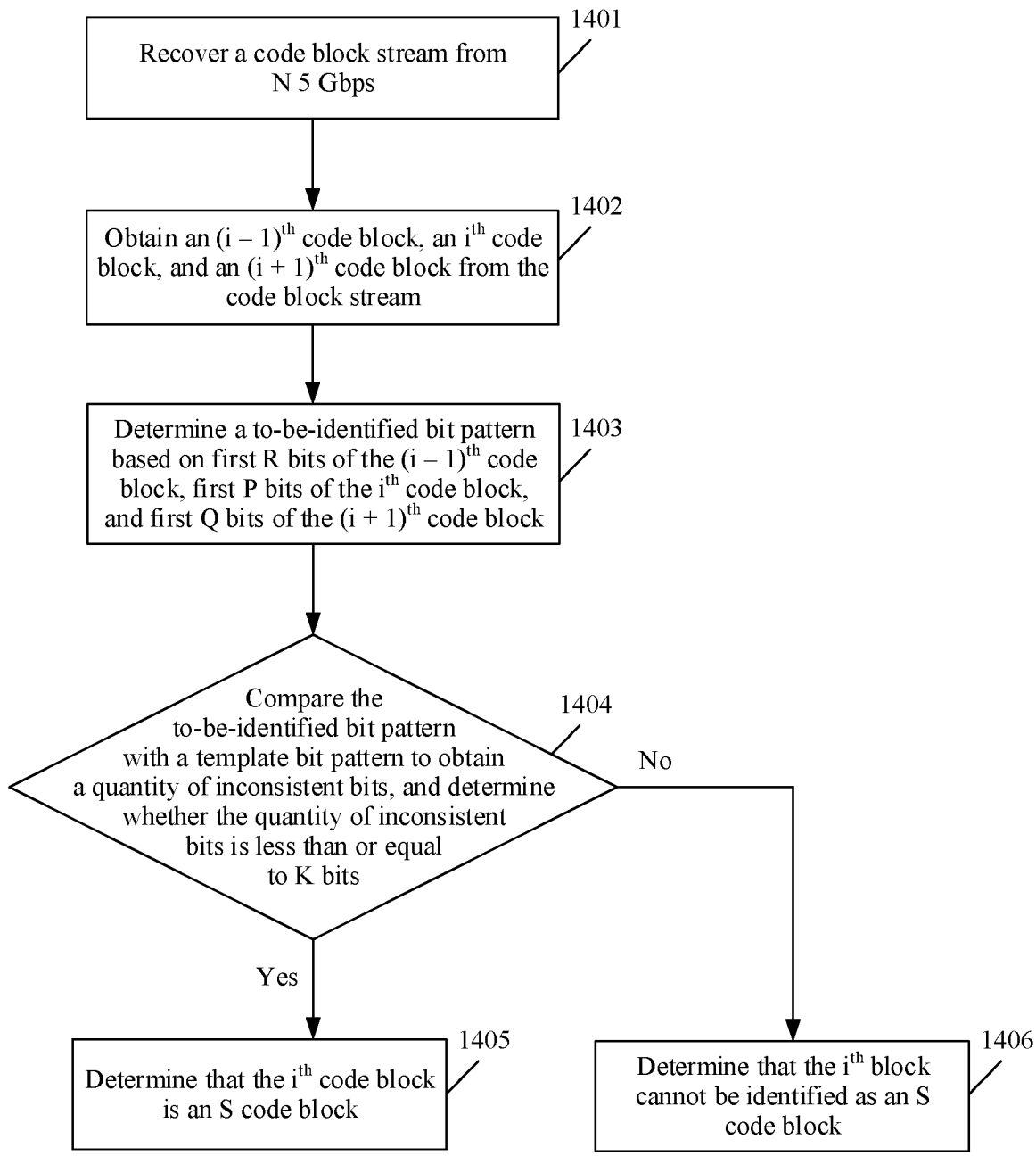

FIG. 14 is a schematic flowchart of a code block identification method according to an embodiment of this application. As shown in FIG. 14, the method includes the following steps.

1401: A receive end restores a code block stream from N 5 Gbps.

1402: The receive end obtains an $(i-1)^{th}$ code block, an $i^{th}$ code block, and an (i+1)th code block from the code block stream.

It may be understood that for a specific description of obtaining, by the receive end, the (i−1)th code block, the $i^{th}$ code block, and the (i+1)th code block, refer to the descriptions of step 1202 and the like shown above. Details are not described herein again.

1403: The receive end determines a to-be-identified bit pattern based on first R bits of the $(i-1)^{th}$ code block, first P bits of the $i^{th}$ code block, and first Q bits of the (i+1)th code block.

1404: The receive end compares the to-be-identified bit pattern with a template bit pattern to obtain a quantity of inconsistent bits. Then, the receive end determines whether the quantity of inconsistent bits is less than or equal to K bits. If yes, step 1405 is performed; otherwise, step 1406 is performed.

For example, when R=P=Q=10, the template bit pattern may be shown in FIG. 7c. It may be understood that P, Q, or R shown in some embodiments of this application is merely an example, and a specific value of P, Q, or R is not limited in some embodiments of this application.

1405: If the quantity of inconsistent bits is less than or equal to the K bits (for example, K=2), the receive end determines that the $i^{th}$ code block is an S code block.

1406: If the quantity of inconsistent bits is greater than the K bits, the receive end determines that the $i^{th}$ code block cannot be identified as an S code block.

In some embodiments of this application, the receive end obtains the $i^{th}$ code block and the two code blocks adjacent to the $i^{th}$ code block, to determine, with reference to the template bit pattern, whether the $i^{th}$ code block is the S code block, thereby effectively improving accuracy of determining whether the $i^{th}$ code block is the S code block and improving system fault tolerance at the same time.

In the foregoing described embodiments, for an implementation that is not described in detail in one embodiment, refer to descriptions in another embodiment. Details are not described herein again. Alternatively, embodiments described in this specification may be independent solutions, or may be combined based on internal logic. These solutions all fall within the protection scope of this application. In other words, the foregoing embodiments may be combined with each other.

The following describes communication apparatuses provided in embodiments of this application.

Figure 15:
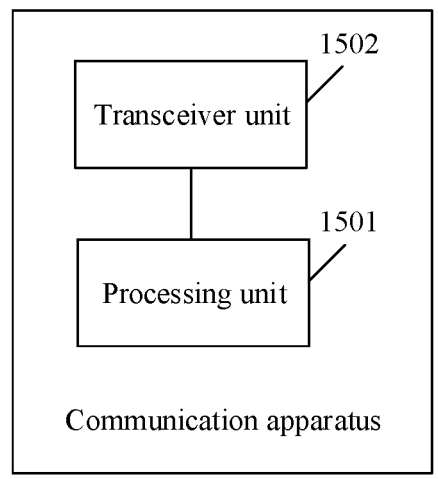
FIG. 15 to FIG. 17 are schematic diagrams of a structure of a communication apparatus according to an embodiment of this application.

FIG. 15 is a schematic diagram of a structure of a communication apparatus according to an embodiment of this application. The communication apparatus may be configured to perform the method shown in FIG. 9, FIG. 10a, FIG. 11, FIG. 12a, FIG. 12b, FIG. 13, or FIG. 14 in the foregoing method embodiment. For example, the communication apparatus may be any form of a switch (or referred to as a switching device, a switching chip, or the like), a router, a network adapter, or the like. A specific form of the communication apparatus is not described in some embodiments of this application. As shown in FIG. 15, the communication apparatus includes a processing unit 1501 and a transceiver unit 1502.

The transceiver unit 1502 is configured to obtain a code block stream, where the code block stream includes a first code block.

The processing unit 1501 is configured to: determine a to-be-identified bit pattern, and compare the to-be-identified bit pattern with a template bit pattern to obtain a quantity of inconsistent bits; and when the quantity of inconsistent bits is less than or equal to a first threshold, identify the first code block as a first boundary code block.

In a possible implementation, the processing unit 1501 is configured to: when the quantity of inconsistent bits is greater than or equal to 1, and the quantity of inconsistent bits is less than or equal to the first threshold, identify the first code block as the first boundary code block.

For example, the second threshold may be 2, 1, or the like. This is not limited in embodiments of this application.

In a possible implementation, the processing unit 1501 is configured to: when a first bit pattern is inconsistent with a first template bit pattern, and the quantity of inconsistent bits between the to-be-identified bit pattern and the template bit pattern is less than or equal to the first threshold, identify the first code block as the first boundary code block.

In a possible implementation, the processing unit 1501 is configured to: determine a second bit pattern, where the second bit pattern is a bit pattern corresponding to a second code block; compare the second bit pattern with a second template bit pattern; and when the quantity of inconsistent bits is less than or equal to the first threshold, and a quantity of inconsistent bits between the second bit pattern and the second template bit pattern is less than or equal to a second threshold, identify the first code block as the first boundary code block.

In a possible implementation, the processing unit 1501 is configured to: determine a second bit pattern; compare the second bit pattern with a second template bit pattern; and when the quantity of inconsistent bits between the to-beidentified bit pattern and the template bit pattern is less than or equal to the first threshold, and the second bit pattern is inconsistent with the second template bit pattern, identify the first code block as the first boundary code block.

In a possible implementation, the processing unit 1501 is configured to determine a first code group from the code block stream based on the first code block, where the first code group starts with the first code block.

For descriptions of the first bit pattern, the second bit pattern, a third bit pattern, the to-be-identified bit pattern, the template bit pattern, the first code block, the second code block, a third code block, the first boundary code block, and the like, refer to the foregoing embodiments and the like. Details are not described here.

For example, the transceiver unit 1502 may be configured to perform step 901 in FIG. 9, and the processing unit 1501 may be configured to perform step 902 to step 904 in FIG. 9.

For example, the transceiver unit 1502 may be further configured to perform step 1006 in FIG. 10a, and the processing unit 1501 may be further configured to perform step 1007 to step 1010 in FIG. 10a.

For example, the processing unit 1501 may be further configured to perform step 1101 to step 1108 in FIG. 11.

For other functions or steps of the transceiver unit and the processing unit, refer to the foregoing method embodiments. Details are not listed one by one herein.

Division into the modules in embodiments of this application is an example; and is merely logical function division, and may be other division during actual implementation. In addition, functional modules or units in embodiments of this application may be integrated into one processor, or each of the modules or units may exist alone physically, or two or more of the modules or units may be integrated into one module. The integrated modules or units may be implemented in a form of hardware, or may be implemented in a form of a software functional module.

The foregoing describes the communication apparatus in some embodiments of this application. The following describes a possible product form of the communication apparatus. It should be understood that any product in any form having the function of the communication apparatus described in FIG. 15 falls within the protection scope of embodiments of this application. It should be further understood that the following description is merely an example, and does not limit a product form of the communication apparatus in embodiments of this application.

In a possible implementation, when the communication apparatus shown in FIG. 15 is any form of a switch, a router, a network adapter, or the like, or an apparatus in any form of a switch, a router, a network adapter, or the like, or an apparatus used in matching with any form of a switch, a router, a network adapter, or the like, the processing unit 1501 may be one or more processors, and the transceiver unit 1502 may be a transceiver. Alternatively, the transceiver unit 1502 may be a sending unit and a receiving unit. The sending unit may be a transmitter, and the receiving unit may be a receiver. The sending unit and the receiving unit may be integrated into one component, for example, a transceiver. In some embodiments of this application, the processor and the transceiver may be coupled, or the like. A connection manner between the processor and the transceiver is not limited in some embodiments of this application.

Figure 16:
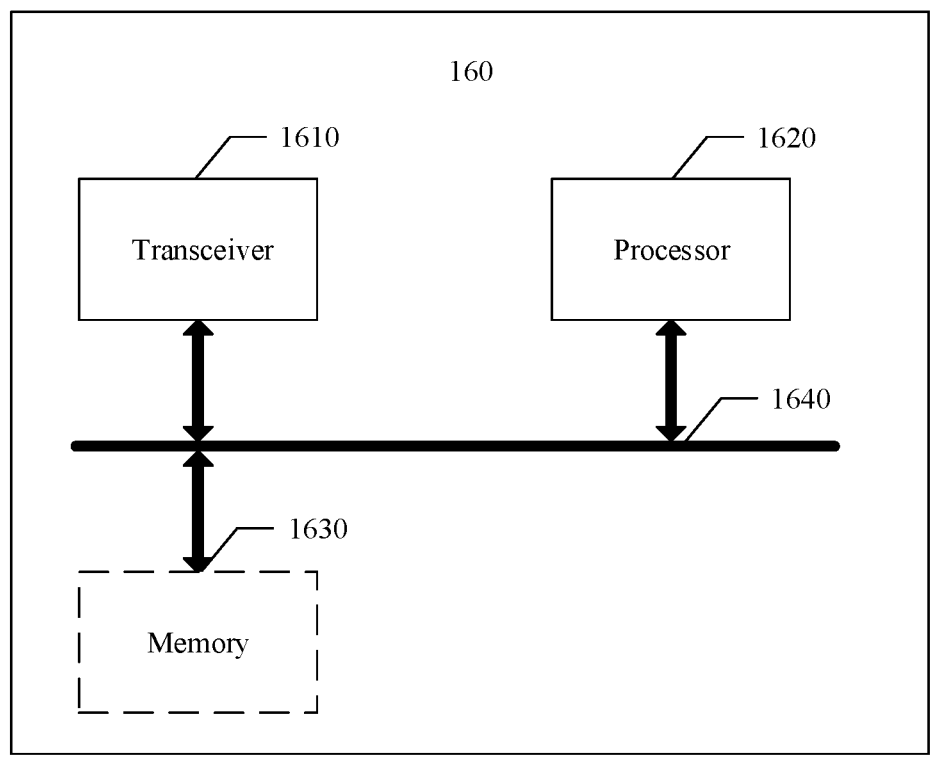

As shown in FIG. 16, a communication apparatus 160 includes one or more processors 1620 and transceivers 1610.

In some embodiments of this application, the processor 1620 and the transceiver 1610 may be configured to perform the method performed by the foregoing communication apparatus or receive end.

For example, the transceiver 1610 may be configured to receive a code block stream, and the processor 1620 may be configured to identify a first code block in the code block stream, or the like.

For descriptions of a first bit pattern, a second bit pattern, a third bit pattern, a to-be-identified bit pattern, a template bit pattern, a first code block, a second code block, a third code block, a first boundary code block, and the like, refer to the foregoing embodiments and the like. Details are not described here.

For a function, an operation, or the like performed by the transceiver and/or the processor, refer to embodiments shown in FIG. 15, or refer to method embodiments shown in FIG. 9, FIG. 10a, FIG. 11, FIG. 12a, FIG. 12b, FIG. 13, or FIG. 14. Details are not described one by one herein again.

In various implementations of the communication apparatus shown in FIG. 16, the transceiver may include a receiver and a transmitter, the receiver is configured to perform a receiving function (or operation), and the transmitter is configured to perform a transmitting function (or operation). The transceiver is configured to communicate with another device/apparatus through a transmission medium.

Optionally, the communication apparatus 160 may further include one or more memories 1630, configured to store program instructions and/or data. The memory 1630 is coupled to the processor 1620. The coupling in some embodiments of this application may be an indirect coupling or a communication connection between apparatuses, units, or modules in an electrical form, a mechanical form, or another form, and is used for information exchange between the apparatuses, the units, or the modules. The processor 1620 may cooperate with the memory 1630. The processor 1620 may execute the program instructions stored in the memory 1630. Optionally, at least one of the one or more memories may be included in the processor.

A specific connection medium between the transceiver 1610, the processor 1620, and the memory 1630 is not limited in some embodiments of this application. In some embodiments of this application, the memory 1630, the processor 1620, and the transceiver 1610 are connected through a bus 1640 in FIG. 16. The bus is represented by using a thick line in FIG. 16. A manner of connection between other components is merely an example for description, and imposes no limitation. The bus may be classified into an address bus, a data bus, a control bus, and the like. For ease of representation, only one thick line is for representing the bus in FIG. 16, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly executed and accomplished by a hardware processor, or may be executed and accomplished by using a combination of hardware and software modules in the processor.

In some embodiments of this application, the memory may include but is not limited to a nonvolatile memory, for example, a hard disk drive (HDD) or a solid-state drive (SSD), a random access memory (RAM), an erasable programmable read-only memory (EPROM), a read-only memory (ROM), or a compact disc read-only memory (CD-ROM). The memory is any storage medium that can be used to carry or store program code in a form of an instruction or a data structure and that can be read and/or written by a computer (for example, the communication apparatus shown in this application). However, this is not limited thereto. The memory in embodiments of this application may alternatively be a circuit or any other apparatus that can implement a storage function, and is configured to store the program instructions and/or the data.

It may be understood that the communication apparatus shown in some embodiments of this application may alternatively include more components or the like than those shown in FIG. 16. This is not limited in embodiments of this application. The method performed by the processor and the transceiver above is merely an example. For specific steps performed by the processor and the transceiver, refer to the method described above.

It may be understood that the communication apparatus shown in some embodiments of this application may alternatively include more components or the like than those shown in FIG. 16. This is not limited in embodiments of this application.

It may be understood that the method performed by the processor and the transceiver above is merely an example. For specific steps performed by the processor and the transceiver, refer to the method described above.

Figure 17:
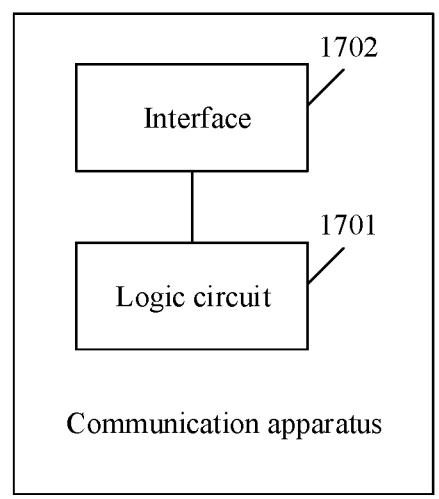

In another possible implementation, when the communication apparatus is a chip system, for example, a chip system in a switch (or referred to as a switching device or a switching chip), a router, or a network adapter, the processing unit 1501 may be one or more logic circuits. The transceiver unit 1502 may be an input/output interface, or referred to as a communication interface, an interface circuit, an interface, or the like. Alternatively, the transceiver unit 1502 may be a sending unit and a receiving unit. The sending unit may be an output interface, the receiving unit may be an input interface, and the sending unit and the receiving unit are integrated into one unit, for example, an input/output interface. As shown in FIG. 17, a communication apparatus shown in FIG. 17 includes a logic circuit 1701 and an interface 1702. To be specific, the foregoing processing unit 1501 may be implemented by the logic circuit 1701, and the foregoing transceiver unit 1502 may be implemented by the interface 1702. The logic circuit 1701 may be a chip, a processing circuit, an integrated circuit, a system on chip (SoC), or the like, and the interface 1702 may be a communication interface, an input/output interface, or the like. In some embodiments of this application, the logic circuit may further be coupled to the interface. A specific connection manner of the logical circuit and the interface is not limited in some embodiments of this application.

In some embodiments of this application, the logic circuit and the interface may be configured to perform a function, an operation, or the like performed by the foregoing communication apparatus or receive end.

For example, the interface 1702 is configured to input a code block stream, where the code block stream includes a first code block and the like. The logic circuit 1701 is configured to: determine a to-be-identified bit pattern, and compare the to-be-identified bit pattern with a template bit pattern to obtain a quantity of inconsistent bits; and when the quantity of inconsistent bits is less than or equal to a first threshold, identify the first code block as a first boundary code block.

For specific implementations of the logic circuit and the interface, refer to the foregoing embodiments. Examples are not provided one by one herein.

It may be understood that for descriptions of a first bit pattern, a second bit pattern, a third bit pattern, a to-be-identified bit pattern, a template bit pattern, a first code block, a second code block, a third code block, a first boundary code block, and the like, refer to the foregoing embodiments and the like. Details are not described here.

In addition, this application further provides a computer program. The computer program is used to implement operations and/or processing performed by the communication apparatus or receive end in the method provided in this application.

This application further provides a computer-readable storage medium. The computer-readable storage medium stores computer code When the computer code is run on a computer, the computer is enabled to perform operations and/or processing performed by the communication apparatus or receive end in the method provided in this application.

This application further provides a computer program product. The computer program product includes computer code or a computer program. When the computer code or the computer program is run on a computer, operations and/or processing performed by the communication apparatus or receive end in the method provided in this application are/is performed.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the technical effects of the solutions provided in embodiments in this application.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a readable-storage medium, and includes several instructions for instructing a computer device (which may be a personal computer, a server, a network device, or the like) to perform all or some of the steps of the methods described in embodiments of this application. The readable-storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A code block identification method, wherein the method comprises:
    obtaining a code block stream, wherein the code block stream comprises a first code block;
    determining a to-be-identified bit pattern, wherein the to-be-identified bit pattern comprises a first bit pattern, and the first bit pattern corresponds to the first code block;
    comparing the to-be-identified bit pattern with a template bit pattern to obtain a quantity of inconsistent bits, wherein the template bit pattern comprises a first template bit pattern, and the first template bit pattern corresponds to a first boundary code block; and
    identifying the first code block as the first boundary code block when the quantity of inconsistent bits is less than or equal to a first threshold, wherein the first boundary code block is a start code block of a first code group, wherein the first code group starts with the start code block.

2. The method according to claim 1, wherein the first bit pattern comprises a pattern comprising a $0^{th}$ bit to a $9^{th}$ bit of the first code block, and a start bit of the first code block is the $0^{th}$ bit.

3. The method according to claim 2, wherein the $0^{th}$ bit of the first code block and the $1^{st}$ bit of the first code block are a synchronization header of the first code block, and the $2^{nd}$ bit of the first code block to the $9^{th}$ bit of the first code block are a control block type field of the first code block.

4. The method according to claim 1, wherein the identifying of the first code block as the first boundary code block when the quantity of inconsistent bits is less than or equal to a first threshold comprises:
    when the first bit pattern is inconsistent with the first template bit pattern and the quantity of inconsistent bits is less than or equal to the first threshold, identifying the first code block as the first boundary code block.

5. The method according to claim 1, wherein the code block stream further comprises a second code block, the to-be-identified bit pattern further comprises a second bit pattern, and the second bit pattern corresponds to the second code block; and
    the template bit pattern further comprises a second template bit pattern, and the second template bit pattern corresponds to the second bit pattern.

6. The method according to claim 5, wherein the second template bit pattern is a template bit pattern corresponding to any one of the following code blocks:
    a second boundary code block, an idle code block, a sequence code block, a signal code block, or an error code block.

7. The method according to claim 5, wherein the second bit pattern comprises a pattern comprising a $0^{th}$ bit to a $9^{th}$ bit of the second code block, and a start bit of the second code block is the $0^{th}$ bit.

8. The method according to claim 1, wherein the code block stream further comprises a third code block, the to-be-identified bit pattern further comprises a third bit pattern, and the third bit pattern corresponds to the third code block; and
    the template bit pattern further comprises a third template bit pattern, and the third template bit pattern corresponds to the third bit pattern.

9. The method according to claim 8, wherein the third template bit pattern corresponds to a data code block.

10. The method according to claim 5, wherein the identifying of the first code block as the first boundary code block when the quantity of inconsistent bits is less than or equal to a first threshold comprises:
    when the first bit pattern is consistent with the first template bit pattern and the quantity of inconsistent bits is less than or equal to the first threshold, identifying the first code block as the first boundary code block.

11. The method according to claim 1, wherein the identifying of the first code block as the first boundary code block when the quantity of inconsistent bits is less than or equal to a first threshold comprises:
    determining a second bit pattern, wherein the second bit pattern corresponds to a second code block;
    comparing the second bit pattern with a second template bit pattern to obtain a second quantity of inconsistent bits; and
    when the second quantity of inconsistent bits is less than or equal to the first threshold and the second bit pattern is consistent with the second template bit pattern, identifying the first code block as the first boundary code block.

12. The method according to claim 1, wherein after identifying the first code block as the first boundary code block, the method further comprises:
    determining the first code group from the code block stream based on the first code block, wherein the first code group starts with the first code block.

13. The method according to claim 12, wherein the first code group comprises 195 data code blocks and one end code block.

14. The method according to claim 12, wherein the first code group carries T client signals, and T is a positive integer.

15. The method according to claim 14, wherein T=24.

16. A communication apparatus, comprising:
    a transceiver, configured to obtain a code block stream, wherein the code block stream comprises a first code block; and
    a processing circuit, configured to determine a to-be-identified bit pattern, wherein the to-be-identified bit pattern comprises a first bit pattern, and the first bit pattern corresponds to the first code block, wherein
    the processing circuit is further configured to compare the to-be-identified bit pattern with a template bit pattern to obtain a quantity of inconsistent bits, the template bit pattern comprises a first template bit pattern, and the first template bit pattern corresponds to a first boundary code block, and the processing circuit is further configured to identify the first code block as the first boundary code block when the quantity of inconsistent bits is less than or equal to a first threshold, wherein the first boundary code block is a start code block of a first code group, wherein the first code group starts with the start code block.

17. The apparatus according to claim 16, wherein the first bit pattern comprises a pattern comprising a $0^{th}$ bit to a $9^{th}$ bit of the first code block, and a start bit of the first code block is the $0^{th}$ bit.

18. The apparatus according to claim 17, wherein the $0^{th}$ bit of the first code block and the $1^{st}$ bit of the first code block are a synchronization header of the first code block, and the $2^{nd}$ bit of the first code block to the $9^{th}$ bit of the first code block are a control block type field of the first code block.

19. The apparatus according to claim 16, wherein
the processing circuit is configured to: when the first bit pattern is inconsistent with the first template bit pattern and the quantity of inconsistent bits is less than or equal to the first threshold, identify the first code block as the first boundary code block.

20. The apparatus according to claim 16, wherein the code block stream further comprises a second code block, the to-be-identified bit pattern further comprises a second bit pattern, and the second bit pattern corresponds to the second code block; and
the template bit pattern further comprises a second template bit pattern, and the second template bit pattern corresponds to the second bit pattern.

* * * * *

UNITED STATES PATENT AND TRADEMARK OFFICE
CERTIFICATE OF CORRECTION

PATENT NO. : 12,284,034 B2  
APPLICATION NO. : 18/324372  
DATED : April 22, 2025  
INVENTOR(S) : Rixin Li et al.

Page 1 of 1

It is certified that error appears in the above-identified patent and that said Letters Patent is hereby corrected as shown below:

On the Title Page (71), Applicant, Line 2, delete "GuangDong (CN)" and insert -- Shenzhen (CN) --, therefor.

Signed and Sealed this
First Day of July, 2025

Coke Morgan Stewart
*Acting Director of the United States Patent and Trademark Office*